United States Patent [19]

Sakurada et al.

[11] 4,175,842

[45] Nov. 27, 1979

[54] EXPOSURE CONTROL SYSTEM FOR A CAMERA

[75] Inventors: Nobuaki Sakurada; Tadashi Ito, both of Yokohama; Nobuhiko Shinoda, Tokyo; Fumio Ito, Yokohama; Hiroyashu Murakami, Tokyo; Masaharu Kawamura, Hino, Japan

[73] Assignee: Canon Kabushiki Kaisha, Tokyo, Japan

[21] Appl. No.: 866,827

[22] Filed: Jan. 4, 1978

Related U.S. Application Data

[63] Continuation of Ser. No. 660,826, Feb. 24, 1976, abandoned.

[30] Foreign Application Priority Data

Feb. 28, 1975 [JP] Japan .................................. 50/24687
Jul. 3, 1975 [JP] Japan .................................. 50/82270
Dec. 8, 1975 [JP] Japan .................................. 50/146157

[51] Int. Cl.$^2$ ............................................. G03B 17/00
[52] U.S. Cl. .................................. 354/23 D; 354/38; 354/289

[58] Field of Search ................... 354/23 D, 38, 50, 51, 354/60 R, 60 A, 289

[56] References Cited

U.S. PATENT DOCUMENTS

| | | | |
|---|---|---|---|
| 3,982,254 | 9/1976 | Ito et al. | 354/23 D |
| 4,021,829 | 5/1977 | Sekida | 354/289 |

*Primary Examiner*—Russell E. Adams
*Attorney, Agent, or Firm*—Toren, McGeady and Stanger

[57] ABSTRACT

The present invention relates to an exposure control system for a camera with both priority modes in which the photographic information of either the shutter time or the aperture value and the photographic information including the measured value of the brightness of the object to be photographed are processed so as to obtain a proper exposure value. The system is characterized in that either an optional shutter time or an optional aperture value is set by a common set means, for example, a dial in such a manner that the output of the set means is put in the operation means so as to control the exposure amount. Further, the condition showing whether the value set by the common set means is the aperture value or the shutter value is clearly indicated.

26 Claims, 18 Drawing Figures

FIG.7(a)

EXPOSURE CONTROL SYSTEM FOR A CAMERA

This is a continuation of application Ser. No. 660,826, filed Feb. 24, 1976, now abandoned.

BACKGROUND OF THE INVENTION

1. Field of the Invention

The present invention relates to an exposure control system for a camera with both priority modes in which the photographic information of either the shutter time or the aperture value and the photographic information including the measured value of the brightness of the object to be photographed are processed so as to obtain a proper exposure value.

2. Description of the Prior Art

The proper exposure value for a camera is calculated from the measured value of the brightness of the object to be photographed by selecting the combination of the aperture value with shutter time accordingly to the sensitivity of the film to be used. It is difficult to tell whether the shutter time priority mode in which out of various photographic informations the shutter time is set at first and then the aperture value is obtained from the operation result or whether the aperture value priority mode in which the aperture value is set at first and then the shutter time is obtained from the operation result. Consequently, in the case of the recent automatic exposure control camera, a camera with both priority modes in which the shutter time priority mode and the aperture value priority mode can easily be changed over from each other is in great demand and various proposals have so far being made therefore. However in the conventional camera with both priority modes the circuit and the mechanism are too much complicated to be built in a compact camera.

SUMMARY OF THE INVENTION

The purpose of the present invention is to offer a circuit system in which the conventional camera with a single priority mode can be converted into a camera with both priority modes by means of a slight modification of the mechanism and a slight addition of a small number of elements this is accomplished with such ease and simplicity that it is especially convenient for making compact cameras with both priority modes.

Another purpose of the present invention is to offer a common information input means by means of which either the shutter time or the aperture value can be set, whereby by simply providing a change over means for the selection of the priority mode, a camera with both priority modes can easily be realized.

Further, an additional purpose of the present invention is to offer a display device which indicates clearly whether the input set by means of the common information input means is that of the shutter time or that of the aperture value.

Further, a purpose of the present invention is to offer a device in accordance to which by simply setting the aperture ring at the exchangeable photographic lens always at a fixed point, the then desired priority mode can be selected by means of a single operation of the change over means.

Further purposes of the present invention will be disclosed from the detailed explanations to be made in accordance with the accompanying drawings.

In the case of a camera with the control system in accordance with the present invention, a single common set dial can be used as the input means of the shutter time information and the input means of the aperture value information in such a manner that not only the number of the components and the manufacturing cost can be reduced but also the operation members for photographying can be arranged centralized so that the operability of the camera can be improved.

DETAILED DESCRIPTION OF PREFERRED EMBODIMENTS

Figure 1:
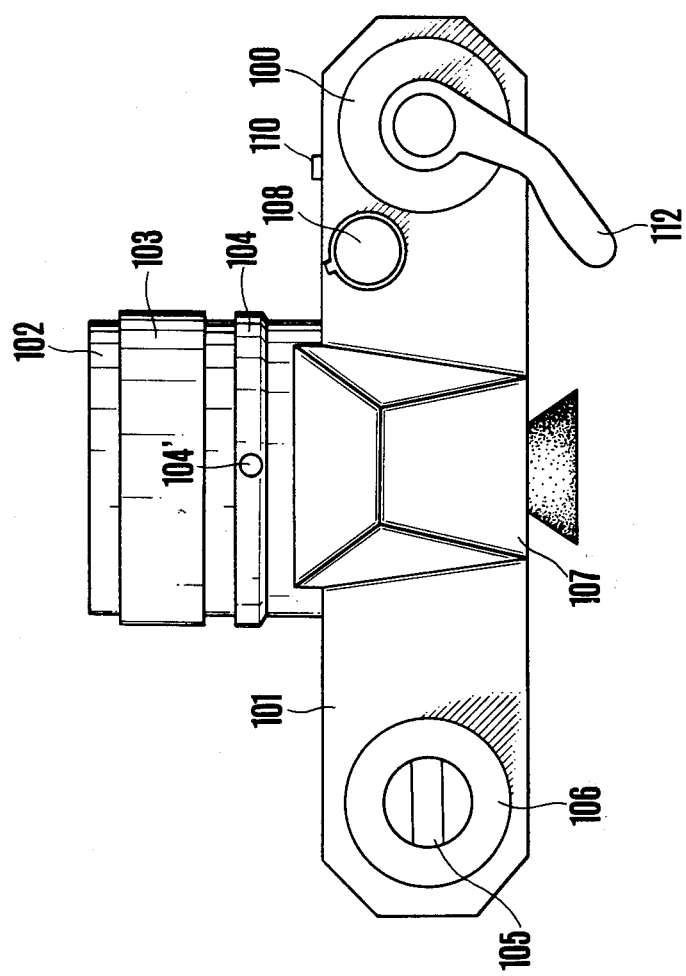
FIG. 1 shows a plan view of a camera which can take photographs either with shutter time priority or with aperture value priority and is suited to be combined with the exposure control system in accordance with the present invention.

FIG. 1 shows a plan view of a camera which can take photographs either with shutter time priority or with aperture value priority and is suited to be combined with the exposure control system in accordance with the present invention. In the drawing 101 is the camera body, 102 the interchangeable lens and 103 the distance adjusting ring. 104 is the aperture ring and 104' is the mark for the automatic exposure photography provided on the ring. These lens mechanisms are interchangeable with those which are used in the conventional automatic exposure camera. 105 is the film rewinding lever, 106 the film sensitivity setting dial, 107 the pentagonal prism part, 108 the release button and 112 the winding up lever. 100 is the information setting dial for setting the shutter time information and the aperture information. The information setting dial can be used either for the priority on shutter time or on aperture value commonly, being switched over by means of the switch 110. The electrical input means to be operated can be a single one consisting of for example, variable resistance, pellet resistance and so on. In the case of a camera or a digital control system, it consist of a digital switch.

Figure 2:
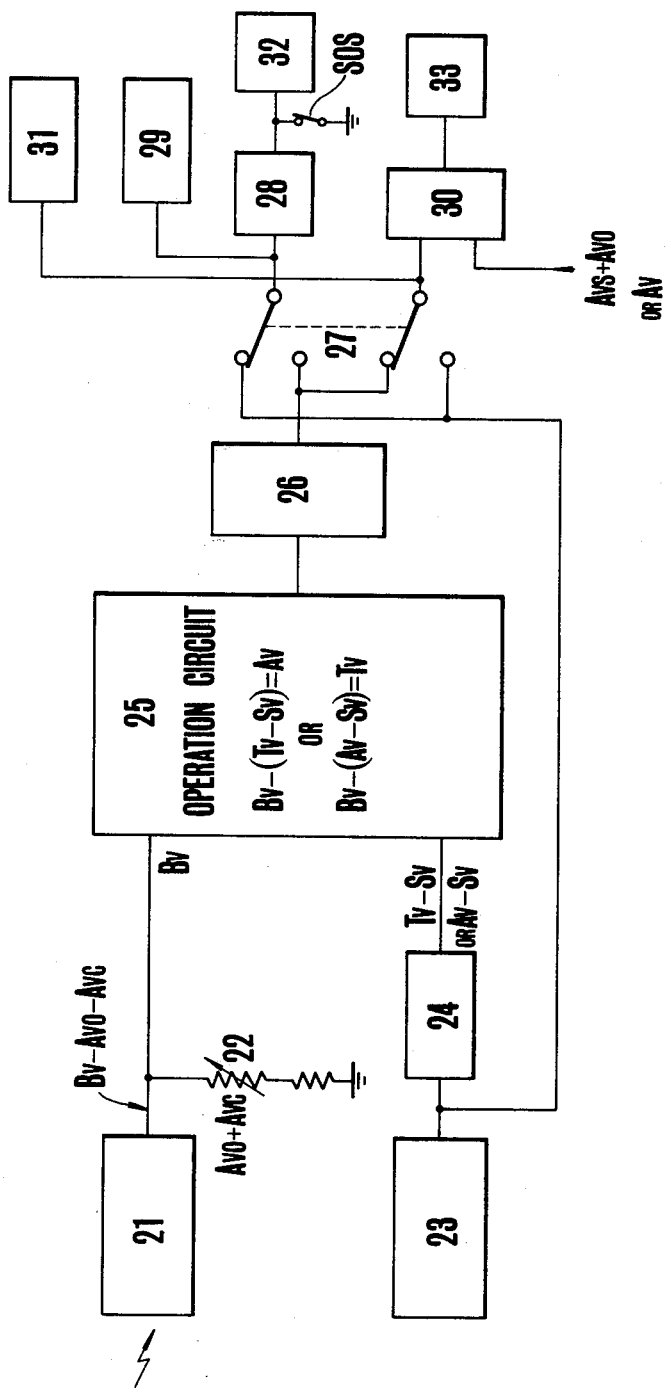
FIG. 2 shows a circuit system of an embodiment of the exposure control system in accordance with the present invention.

FIG. 2 shows a circuit system of an embodiment of the exposure control system in accordance with the present invention, in which an analog operation system is adopted. In the drawing, 21 is the light measuring circuit, which consists of a silicone photocell with superior light sensing characteristics, a logarithmical amplifier and so on. The output of the light measuring circuit corresponds to (BV−Avo−Avc) in the case of the TTL totally opened light measurement. The variable resistance 22 is adjusted by means of the totally opened signal pin at the side of the lens in such a manner that for example, the gain of the amplifier is changed so as to compensate the value Bv with the output. Hereby Bv, Avo and Avc are the well known Appex index, whereby Bv is the information of the brightness, Avo the maximum aperture value F information of the lens, serving to adjust the measured light amount in accordance with the maximum aperture value of the lens at the time of the TTL totally opened light measurement, and Avc the maximum aperture adjustment information serving to adjust the non-proportionality between the displacement of the diaphragm and the change of the measured light amount in case the maximum aperture value is large. 23 is a variable resistance for the information setting corresponding to the setting dial 100 shown in FIG. 1, in which the Appex index of the shutter time or the aperture value, namely Tv or Av is set and from whose output is subtracted the film sensitivity information (Sv) through the variable resistance for setting the film sensitivity information (Sv). This is done in such a manner that at the output of the variable resistance 24 an output corresponding to (tv−Sv) or (av−Sv) appears. The outputs of these variable resistances 23, 24 namely Bv and Tv−Sv, or Bv and Av−are applied to the two input terminals of the analog operation circuit 25, for example an operation Bv−(Tv−Sv) or BV−(Av−Sv) is carried out. This is done in such a manner that the value Av or the value Tv is produced at the output terminal of the operation circit 25 which may, for example, be an operational amplifier. The information of this operation (AV or Tv) is stored in the memory circuit 26. The memory circuit presents a memory condenser or a memory register so that the output of the operation circuit is stored before the mirror-up. The memory analog information (Tv or Av) of 26 is applied to the priority mode change over switch 27. Thus, when 26 is the register memory, the information is again digital-analog converted into analog information to be applied to the switch 27. The change over means 27 can consist of an electrical analog switch or of a mechanical switch. 28 is the actual time prolongation circuit, 29 the shutter time indication circuit, 32 the control magnet for the rear shutter plane, 30 the comparator, 31 the aperture value indication circuit and 33 the control magnet for aperture. The switch SOS serves to operate the control magnet at any optional time during the long time exposure so as to close the shutter.

In the case with shutter time priority the switch 27 is at the position shown in the drawing, the value Tv corresponding to the shutter time set at the set dial 100 shown in FIG. 1 is produced at the output of the variable resistance 23 and applied to the actual time prolongation circuit 28 and the shutter time indication circuit 29 through the switch 27, while the value Av obtained from the operation result of the operation circuit 25 is put in the one input of the comparator 30 through the switch 27. In the other input of the comparator 30, the signal corresponding to (number of steps+number of step to be opened by) if the lens is of the step number control or to the value Av if the lens is of the absolute value control. This is done in such a manner that the diaphragm mechanism is controlled by means of the output of the comparator. Hereby the Av value of the operation result is also put in the aperture value indication circuit 31.

In the case of the photography with aperture value priority contrary to the above case, the preset Av value from the variable resistance 23 is put in the comparator 30 and the aperture value indication circuit 31. Operation result Tv value from the operation circuit 25 and the memory circuit 26 is put in the actual time prolongation circuit 28 and the shutter time indication circuit 29. By means of the output of the actual time prolongation circuit 28, the control magnet 32 of the rear shutter plane is driven, while by means of the output of the comparator 30 the control magnet 33 for the diaphragm is controlled so as to obtain a proper exposure.

As explained above, in accordance with the exposure control system of the present invention, by so designing that Tv and Av are set by means of one single input means and the operation circuit carries out only the addition and the subtraction of the Appex index, a camera which can take photograph optionally with shutter time priority or aperture value priority can be composed by only providing a priority mode changing over switch. In this manner the operation circuit can be used in common so that the number of the elements can be reduced so that a camera which can take photographs either with shutter time priority or aperture value priority can be realized without large increase of the manufacturing cost.

Figure 3:
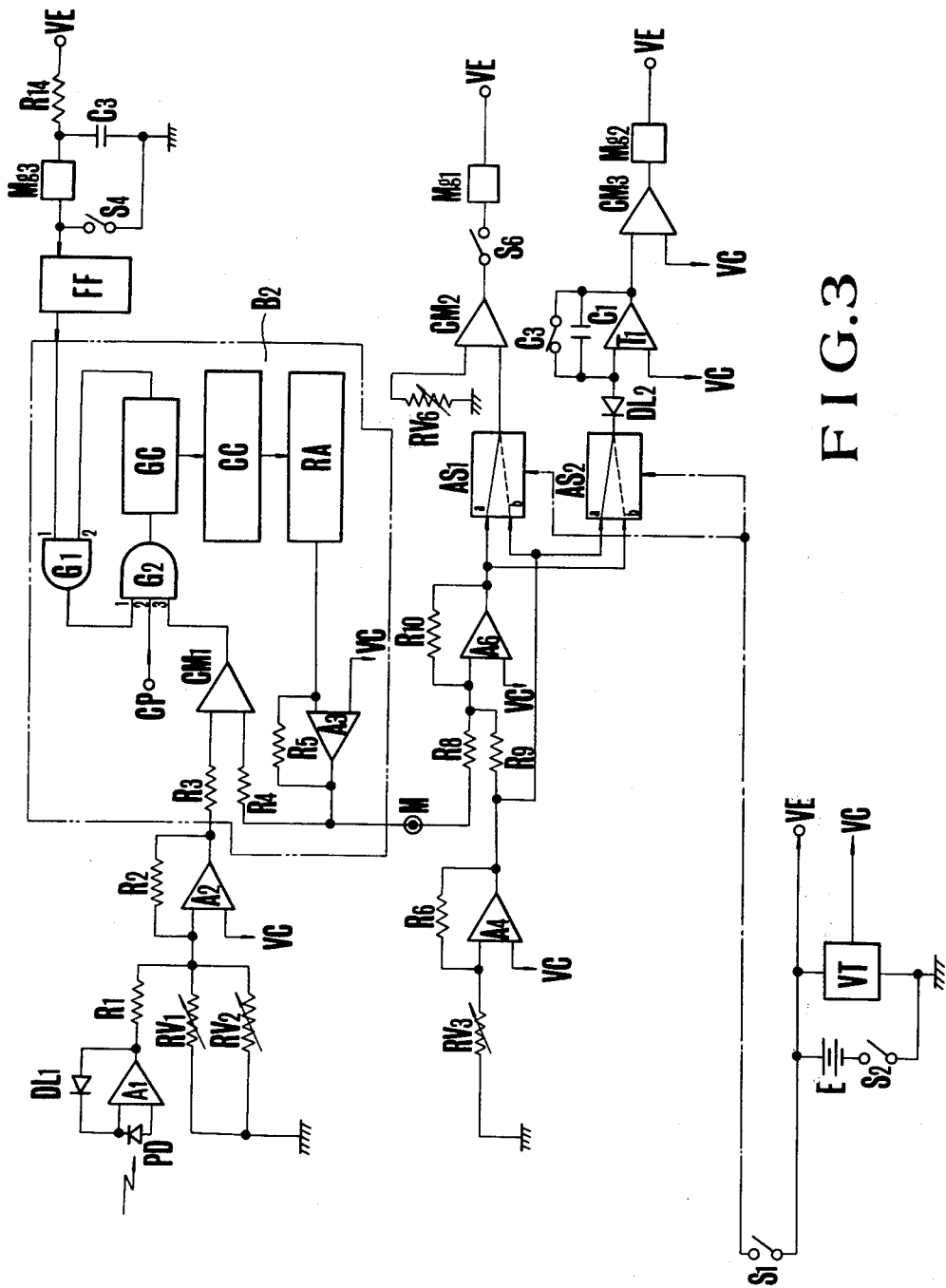
FIG. 3 shows a circuit composition of an embodiment of the exposure control system in accordance with the present invention.

FIG. 3 shows a circuit composition of an embodiment of the exposure control system in accordance with the present invention, in which the brightness of the object to be photographed is memorized in a digital way. In the drawing, the light beam coming from the object to be photographed through the photographic lens (not shown in the drawing) enters into the finder optical system (not shown in the drawing) so as to be converted to an electrical signal by means of the light sensing element PD provided in the optical system. As a light sensing element for example, a silicone photodiode is suitable. The output of the light sensing element PD is logarithmically compressed by means of the operation amplifier $A_1$ presenting a diode $DL_1$ with logarithmic compression characteristics in the feed back route, and put in the second operation amplifier $A_2$ through the resistance. This input signal is (object brightness Bv)−(Totally opened aperture value information of photographic lens Avo)−(Totally opened aperture value compensation information Avc), whereby the film sensitivity information Sv from $RV_1$ and the totally opened F value Avo and the totally opened F value compensation information Avc from $RV_2$ are put in the second operation amplifier $A_2$, so as to be operated in such a manner that the signal $-Ev= -(Bv+Sv)$ is produced by $A_2$. This signal is put in the comparator $CM_1$ through the resistance $R_3$ while the output of $CM_1$ is applied to the input terminal 3 of the AND gate $G_2$. $B_2$ surrounded with the dotted line in the drawing is the digital memory device. At the connecting point of the capacitor $C_3$ and the resistance 14 connected in series between the terminal of the current source and the earth terminal, a magnet $Mg_3$ to be supplied with current by the closing operation of the start switch $S_4$ is connected by means of the current supply to this $Mg_3$, the switchon signal is produced at the output of the Flip Flop FF and applied to the input 1 of the NAND gate G. The output of the NAND gate $G_1$ is applied to the AND gate $G_2$, while to the terminal 2 of the $G_2$ for example, a clock pulse CP is applied. The digital memory device $B_2$ presents a digital-analog converter, a gate control circuit GC to be controlled by the output of the gate $G_2$, a counter CC to be controlled by the output of the gate control circuit GC and the resistance circuit RA, whereby the output of RA is applied to the other input terminal of the above mentioned comparator $CM_1$ by means of the resistance $R_4$ through the operation amplifier $A_3$ so as to be compared with the measured light value signal put in $CM_1$ through the above mentioned $R_3$. Thus, between the gate control circuit GC and the terminal 2 of the gate $G_1$, a control termination signal of the circuit GC is produced at the end of one cycle in such a manner that at the output terminal of $A_3$ a signal corresponding to $-(Ev)$ to be put in the comparator $CM_1$ is produced. The output of the NAND gate $G_1$ for the output of the gate control circuit GC and the output of the Flip Flop FF prevent the passage of the clock pulse CP to be applied to the terminal 2 of the gate $G_2$ together with the output of the comparator $CM_1$, so that the counter CC is kept in the determined state. Namely a signal $-(Ev)$ corresponding to the brightness of the object to be photographed before the mirror up is produced at the terminal M. In order to determine the aperture value by this memory output with priority on shutter speed, the preset shutter time information $-Tv$ is manually set on the variable resistance $RV_3$. This $-Tv$ is inverted by the inverter amplifier into Tv, which is put in the operation amplifier $A_6$ together with the output of the amplifier $A_3$, namely the memory output produced at the terminal M through the resistances $R_9$ and $R_8$ in such a manner that $Av=Ev-Tv$ is produced at the output of the operation amplifier $A_6$. This signal is put in the one input terminal of the comparator $CM_2$ through the analog switch $AS_1$ so as to be compared with the aperture value information set at the variable resistance $RV_6$ functionally engaged with the preset aperture pin to be put in the other input of the comparator $CM_2$ in such a manner that by the effect of the magnet $Mg_1$ controlled by the output of $CM_2$, the aperture preset pin is controlled so as to determined the aperture value. Namely, the preset aperture information corresponding to the output signal Av from $AS_1$ is set at the variable resistance $RV_6$. Further the output Tv of the amplifier $A_4$ is put in the operation amplifier $T_1$ by means of the logarithmic diode $DL_2$ through the analog switch $AS_2$. The amplifier $T_1$ presents a time count start switch $S_3$ functionally engaged with the running of the front shutter plane and the capacitor $C_1$ of the timer circuit in the feed back route whereby by opening the switch $S_3$, the Miller integral is started in such a manner that after the elapse of a preset time an output is put in the comparator $CM_3$. The comparator output operates the magnet $Mg_2$ for controlling the rear shutter plane so as to allow the rear shutter plane to start and to complete the exposure.

In the case of the photography with the aperture value priority mode, the analog switch $AS_1$ and $AS_2$ are changed over from the terminal a to the terminal b by means of the photographic mode change over switch $S_1$ with the close signal to be controlled (in case $S_1$ is closed). In the opened state of the photographic mode change over switch $S_1$, the camera operates with priority on shutter time while in the closed state of the switch $S_1$, the camera operates with priority on aperture value. Namely in the opened state of the switch $S_1$, the switches $AS_1$ and $AS_2$ are closed along the direction shown in dotted line in the drawing, whereby the preset information $-Av$ set at the variable resistance $RV_3$ used to set the above mentioned shutter time is put in the comparator $CM_2$ from the b terminal of the analog switch $AS_1$ through the amplifier $A_4$. Further the signal Av and the memory output $-(Ev)$ are put in the operation amplifier $A_6$ through the resistances $R_8$ and $R_9$, in such a manner that at the output of $A_6$, $Tv=Ev-(Av)$ is produced and put in the shutter time control circuit through the b terminal of the analog switch $AS_2$ so as to control the shutter time. In this way, photography with aperture value priority is carried out with the aperture value preset at the variable resistance $RV_3$.

Further in order to preset the aperture value anually, the switch $S_6$ functionally engaged with the aperture ring of the photographic lens is opened in such a manner that no control signal is transmitted to the magnet $Mg_1$ for determining the aperture.

The current source device consists of a battery E, the current source switch $S_2$ and the standard voltage source VT, whereby the standard voltage produced at the output terminal VC of the voltage source VT is applied to each amplifier as shown in the drawing.

Figure 4:
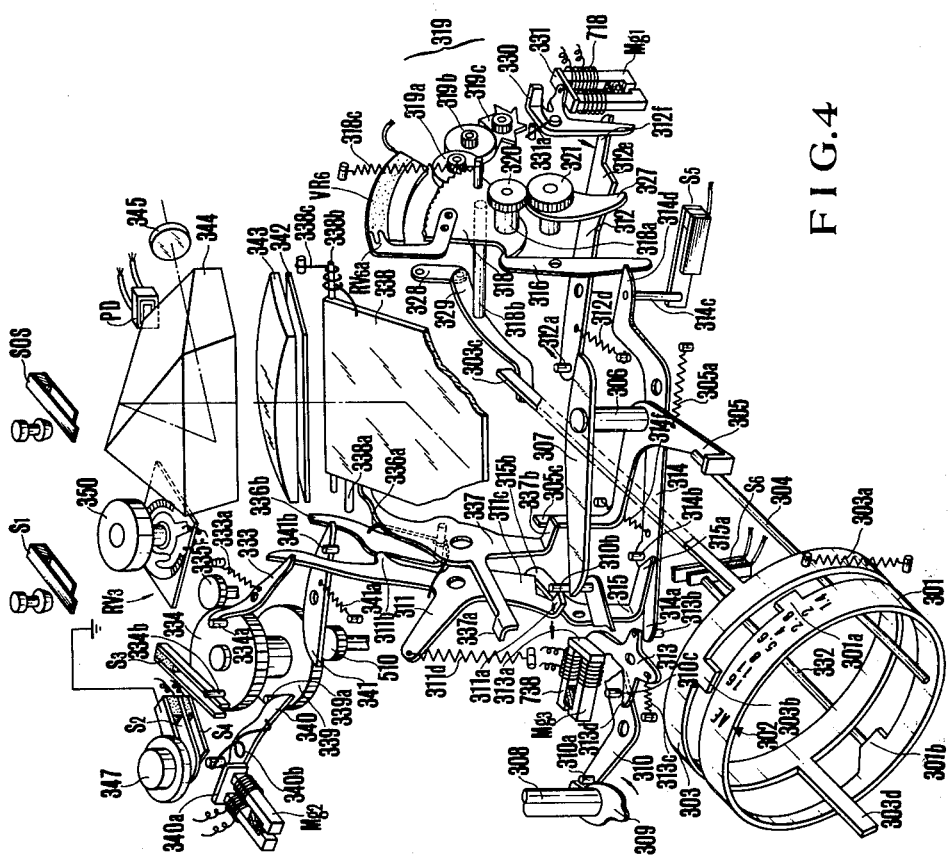
FIG. 4 shows the important members of the internal mechanism of a camera which can take photographs either with shutter time priority or with aperture value priority and is equipped with the exposure control system in accordance with the present invention.

FIG. 4 shows the important members of the internal mechanism of a camera which can take photograph either with shutter time priority or with aperture value priority and equipped with the exposure control system in accordance with the present invention, in the state in which the film winding up and the shutter charge have been completed. 301 is the aperture ring on which the AE index for the automatic aperture setting and the index for the manual aperture setting are provided together with the projection 301a and the cam part 301b.

302 is the index for setting the AE index for the automatic aperture setting with the index for the manual aperture setting. 303 is the aperture preset ring being energized clockwise by means of the spring 303a and presenting a projection 303b engageable with the projection 301a of the above mentioned aperture ring 301. Further on the aperture preset ring 303 an arm 303c is provided whereby the preset ring 303 serves to determine the rotation amount of the bell crank by means of a lever 303d through the aperture setting cam ring (not shown in the drawing), while the bell crank is intended to limit the rotation of the aperture drive ring (not shown in the drawing) so as to determine the opening degree of the diaphragm. 304 is the pin provided on the above mentioned aperture driving ring whose one end engages with the automatic aperture lever 305 energized anticlockwise by means of the spring 305a. This automatic aperture lever 305 presents a rising up part 305c. Further with this automatic aperture lever 305, an intermediate lever 307 is provided coaxially 306. 308 is the winding up shaft of the winding up lever (not shown in the drawing), whereby on the end face of this winding shaft 308 a winding up cam 309 is fixed. 310 is a rotatable intermediate lever, whereby a pin 310a provided on the one end of this intermediate lever 310 engages with the winding up cam. Further at the other end of this intermediate lever 310, a pin 310b is provided, being engaged with the one end of the above mentioned intermediate lever 307 as well as the one end 311a of the mirror driving lever 311. Further by means of the pin 310c provided on the intermediate lever 310, the first holding lever 313 is charged. With the other end of this intermediate lever 307, a pin 312a provided at the one end of the rotatable charge lever 312 can be engaged. This charge lever 312 is energized counterclockwise by means of the spring 312d. Mg₃ is the first holding magnet with a permanent magnet which engages with the one end 313a of the first holding lever 313 while the pin 313b provided at the other end engages with the one end 314a of the release lever 314. This lever 313 is energized clockwise by means of the spring 313c. When the lever 310 is rotated clockwise. Pin 310c rotates the lever 313 anticlockwise against the force of the spring 313c by means of the one end 313d of the lever 313. At the one end of this release lever 314, a pin 314b is provided, whereby the other end 315a of the mirror driving engaging lever 315 with the one end 315b engages with the one side of the above mentioned mirror driving lever 311 is kept of this pin 314b. Further by the end 314d of the release lever 313 the one end of the rotatable AE keeping lever 316 is kept. Further at the other end of the release lever 314 a pin 314c is provided, keeping the movable contact of the memory keeping switch S₅.

However, the switch S₅ is only necessary in the case of the analog memory in FIG. 2 and not necessary in the case of the digital memory in FIG. 3. This release lever 314 is energized clockwise by means of the spring 314f. Hereby the spring 314f is the one weaker than the spring 313c in force. 318 is the AE sector gear kept by the other end of the above mentioned holding lever 316. With this sector gear 318, the gears 319a, 319b and the stop wheel 319c composing the speed adjusting mechanism 319 are engaged. Further the sector gear 318 is provided with a slide member RV$_{6a}$ of the variable resistance RV₆ for deciding the aperture value. On the shaft 318a of this sector gear 318, a gear 320 is mounted so as to be engaged with the AE charge gear 321. On this gear 321 the lever 327 is fixed coaxially and in contact with the other end 312e of the above mentioned charge lever 312. On the above mentioned sector gear 318 a pin 318b is provided, while the end surface of the pin 318b is fixed on the signal lever 329 linked with the support lever 328. The folded end of this signal lever 329 keeps the arm 303c of the above mentioned aperture preset ring 303. The above mentioned AE sector gear 318 is strongly energized by means of the spring 303a against the force of the spring 318c energized counterclockwise on the sector gear 318. Mg₁ is the aperture control magnet with a permanent magnet, whereby in the state supplied with current the magnet Mg₁ is energized so as to compensate the attractive force of the permanent force, while in the state not supplied with current the permanent magnet is in a position to work. The same thing can be said of the above mentioned magnet Mg₃ and the magnet Mg₂ to be explained later. In this way, in the state not supplied with the current the magnet Mg₁ is in a position to attract the iron piece 331 mounted on the attracted lever 330. This attracted lever 330 is energized counterclockwise by means of the spring 331a, whereby the folded end of the lever 330 is in a position to be engaged with the stop wheel 319c of the above mentioned speed adjusting mechanism 319. Further the shoulder 312f at the other end of the charge lever 312 is in contact with the other end of the attracted lever 330. The pin 332 in contact with the movable piece of the manual-auto change over switch. S₆ is provided at the side of the lens, whereby the end surface of this pin 332 is in contact with the cam part 301b of the above mentioned aperture ring 301. The above mentioned mirror driving lever 311 presents a delay device not shown in the drawing, whereby the mirror driving lever 311 is energized counterclockwise by means of the spring 311d, while the one end of the lever 311 is kept by the other end 315b of the above mentioned mirror driving engaging lever 315 and other end is provided at a position at which the end can engage with the one end of the front shutter holding lever 333. This front shutter plane holding lever 333 is energized counterclockwise by means of the spring 333a while the end is engaged with the pin 334a of the front shutter plane gear 334. Further on the front shutter plane 334, a pin 334b is provided, being in contact with the count start switch S₃. This front shutter gear 334 is engaged with the front shutter pinion 335 of the front shutter plane drum not shown in the drawing. The holding part 311b of the above mentioned mirror driving lever 311 keeps the mirror holding lever 336. This holding lever 336 is energized counterclockwise by means of the spring 336a provided between the holding lever 336 and the mirror driving lever 311 in such a manner that the one end of the holding lever 336 engages with the push up lever 337 coaxially born on the mirror driving lever 311. The one end 337a of the push up lever 337 is rotated anticlockwise by the mirror up motion from outside in such a manner that the mirror can be raised up independently. The other end of this push up lever 337 is kept by the push up pin 338a provided on the mirror 338. This mirror 338 can be rotated around the mirror shaft as center.

338c is the spring for returning the mirror. 339 is the rear shutter plane gear 334 provided coaxially with but separately from the front shutter plane gear 334 whereby this rear shutter plane gear 339 is engaged with the rear shutter plane pinion 510 for the rear shutter plane drum. Further on the rear shutter plane gear 339 a pin 339a is provided. 340 is the attracted lever rotated by the above mentioned pin 339a, whereby this attracted lever 340 is attracted by the iron piece 340a by means of the shutter control magnet with permanent magnet Mg₂. This attracted lever 340 is held by the magnet Mg₂, being always energized clockwise by means of the spring 340b. 341 is the rear shutter plane signal lever rotated by the above mentioned pin 339a, whereby this lever 341 is normally kept at the position of the holding pin 341b by means of the spring 341a. The end 336b of the above mentioned mirror holding lever 336 is in engagement with the above mentioned rear shutter plane signal lever 341. The light beam passing through the photographic lens (not shown in the drawing) is seen by the photographer at the eye piece through the mirror 338, the focal plate 342, the condenser lens 343 and the pentaprism 344. PD is a light sensing element such as silicone blue cell. 347 is the shutter button so designed that the switch S₂ is closed by the first stroke of the shutter button 347 while the switch S₄ is closed by the second stroke.

350 is the dial for the common information input with shutter time priority and aperture value priority, whereby it is so designed that the information input variable resistance (RV₃) varies in functional engagement with this dial 350.

S₁ is the priority mode change over switch, which can be switched over by means of the operation button whereby the indication is also changed.

Below the operation of the above mentioned composition will be explained, whereby the case with shutter time prinity will be explained. At first, by means of the change over button, $S_1$ is changed over, while the scale of the dial 350 is set at a shutter time. Then the dial 350 for setting the common information is set at a desired time. At this time, the resistance $RV_3$ for setting Tv or Av assumes a value corresponding to the information setting dial.

The AE index of the aperture ring 301 is set at the index 302 as is shown in the drawing, whereby due to the contact of the cam part 301b with the pin 332 the switch $S_6$ is closed so as to be changed over to the side "AUTO". Then by pushing the shutter button 347, the current source switch $S_2$ is closed so as to start the light measurement, assuming the ready state. By pushing the shutter button 347, further switch $S_4$ is closed in such a manner that the magnetic force of the permanent magnet is compensated with that of the magnet $Mg_3$ in such a manner that the first holding lever 313 is rotated clockwise by means of the spring 313c. Namely, by means of the pin 313b of the first holding lever 313 the one end 314a of the release lever 314 is rotated counterclockwise against the force of the spring 314f. In this way, the pin 314c is rotated clockwise in such a manner that by means of the pin 314c the memory switch $S_5$ is closed whereby the charge voltage of the condencer is memorized while the means of the pin 314c the mirror driving engagement lever 315 is rotated as is explained in detail later. However, in FIG. 4 the memory switch $S_5$ is used while in FIG. 3, the signal produced when the switch $S_4$ is closed is put in the NAND gate through FF so as to be memorized as mentioned above. Further, the release lever 314 is rotated counterclockwise so that the engagement with the sector gear is solved. Further by means of the rotation pin 318b of the sector gear 318 the signal lever 329 is moved downwards, in such a manner that the aperture preset ring 303 whose arm 303c is held by this signal lever 329 rotates the sector gear 318 by means of the spring 303a against the force of the spring 318c. Thus the gears 319a, 319b and 319c forming the speed adjusting mechanism. 319a, 319b and 319c are rotated so as to rotate the stop wheel in the last step counterclockwise. By means of the rotation of the sector gear 318 the slide piece $RV_{6a}$ of the variable resistance $RV_6$ is moved. When this resistance value reaches a certain determined level current is supplied to the magnet $Mg_1$. Thus the magnet force of the permanent magnet is compensated by that of the magnet $Mg_1$, so that the iron piece 331 is released. Thus the attracted lever 330 is rotated counterclockwise by means of the spring, when the folded part is engaged with the stop wheel 319c so as to stop the rotation of the stop wheel 319c. In this way, the position of the sector gear 318. Therefore, when the rotation of the sector gear 318 is stopped as mentioned above the aperture preset ring 303 is rotated into a position of the proper value, whereby the position of the bell crank is determined. In other words, the stop position of the aperture present ring 303 corresponds to the aperture value decided by the information from the light sensing element RD measuring the light coming through the lens and various other informations such as shutter time, the film sensitivity, and the exposure adjustment information. On the other hand, parallel to the start of such AE operation, the automatic aperture mechanism starts. Namely, the first holding lever 313 is rotated clockwise by means of the spring 313c and the release lever 314 is rotated counterclockwise in such a manner that by means of the pin 314b the one end 315a of the mirror driving engagement lever 315 is rotated clockwise. Namely, the engagement of the one side 311c of the mirror driving lever 311 with the one end 315b of the mirror driving engagement lever 315 is released in such a manner that by means of the spring 311d the mirror driving lever 311 is rotated counterclockwise. At the same time, the claw part 311b of the mirror driving lever 311 is kept by the holding lever 336, so that the push up lever bearing the holding lever 336 is rotated counterclockwise. Thus by the folded part 337b of the push up lever 337 the automatic aperture lever 305 engaged with the rising up part 305c of the automatic aperture lever 305 is rotated clockwise. In this way, the pin 304 provided on the aperture driving ring is operated so as to close the diaphragm in accordance with the position of the above mentioned at which the aperture is preset. Further, the counterclockwise rotation of the push up lever 337, the push up pin of the mirror 338a is pushed up in such a manner that the mirror 338 is raised.

With the push up motion of the mirror 338, the delay device (not shown in the drawing) is operated and after the elapse of the time decided by this delay device the front shutter holding lever 333 is rotated clockwise by means of the above mentioned mirror driving lever 311. The delay time by means of this delay device is intended to start the shutter after the elapse of the time in which the totally opened diaphragm is closed down to the minimum. Thus the front shutter plane gear 334 starts to rotate so as to allow the front shutter plane to start to run by means of the front shutter plane pinion 335. With the start of the front shutter plane the count start switch $S_2$ is opened in a conventional way, when the Miller integral starts, whereby after the elapse of the time in accordance with the set shutter speed the comparator $CM_3$ is controlled in such a manner that the rear shutter plane control magnet $Mg_2$ is operated. In this way, the magnet force of the permanent magnet is compensated with that of the magnet $Mg_2$. Thus the lock of the rear shutter plane 339 to the pin 339a by the attracted lever 340 is released in such a manner that the rear shutter plane 339 starts to rotate so as to allow the rear shutter plane to start to run through the rear shutter plane pinion 510. At the termination of the running of the rear shutter plane due to the rotation of the rear shutter plane gear 339 the rear shutter plane signal lever 341 is rotated counterclockwise by means of the pin 339a so as to rotate the mirror holding lever 336 ciockwise. By means of the rotatin of this mirror holding lever 336 the engagement with the mirror driving lever 311 is released. Thus the push up lever 337 is rotated clockwise by means of the spring 305a through the automatic aperture lever 305 where by the mirror 338 assumes the original position by means of the returning spring 338c. At the same time, the automatic aperture lever 305 is rotated counterclockwise by means of the spring 305a in such a manner that the pin 304 provided on the aperture driving ring is restored so as to assume the original opened state. When hereby the winding up operation is carried out by means of the winding up shaft 308, the film is wound up and the shutter is charged while by means of the intermediate levers 310 and 307 the charge lever 312 is charged and further the automatic aperture mechanism and the mirror mechanism are charged. The parts whose engagement with each other is released by the above mentioned release operation are engaged again with each other so as to assume the state shown in the drawing. The analog switches $AS_1$ and $AS_2$ are controlled by the switch $S_1$ provided on the camera in such a manner that when the $S_1$ is closed, the change over from the terminal a to the terminal b is carried out. As is explained in accordance with the above mentioned FIG. 3, the aperture control magnet $Mg_1$ operates in accordance with the aperture value set on $RV_3$ while the rear shutter plane control magnet $Mg_2$ is controlled by the value processed from the aperture information, the object brightness information, the film sensitivity information and so on. Namely, the automatic shutter time determination with aperture value priority. Then the operation of the mechanism is the same as that in the case with shutter time priority. In the case with shutter time priority when the switch $S_1$ is opened, the analog switches $AS_1$ and $AS_2$ are all changed over to the terminal a, whereby the shutter time priority is obtained.

Below, the case with the manual operation will be explained. At first the desired aperture value on the aperture ring 301 is set at the index 302, whereby the pin 332 is out of the engagement with the cam part 301b, so that the switch $S_6$ is opened and the operation is manual, whereby no current is supplied to the aperture control magnet $Mg_1$ in such a manner that the iron piece 331 is kept being attracted by $Mg_1$. When then the shutter button 347 is pushed down, the current source switch $S_2$ is closed so as to start to measure the light. When the shutter button is pushed down further, similarly to the case with shutter time priority, the first holding magnet with a permanent magnet $Mg_3$ is excited in a reversed direction so that the first holding lever 313 is rotated clockwise by means of the spring 313c. Namely by means of the one end 313b of the first holding lever 313 the one end 314a of the release lever 314 is rotated counterclockwise. Namely, the release lever 314 is rotated counterclockwise against the force of the spring 314f. With the counterclockwise rotation of the release lever 314, the holding lever 316 is rotated counterclockwise so as to release the engagement with the section gear. Thus the sector gear 318 is rotated clockwise by means of the spring 303a through the preset ring 303 and the signal lever 329 against the force of the spring 318c so as to move the signal lever 329 down to a determined position by means of the pin 318b. In this way, the aperture preset ring 303 whose arm 303c is held by the signal lever 329 is rotated up to the position of the projection 301a of the aperture ring 301 by means of the spring 303a. Thus the aperture preset ring 303 is rotated into a position corresponding to the set aperture value so as to determine the position of the bell crank.

Further with the counterclockwise rotation of the release lever 314, the automatic aperture mechanism also starts. Namely, with the rotation of the release lever 313 the mirror driving engagement lever 315 is rotated clockwise by means of the pin 314b in such a manner that as in the case with shutter time priority the diaphragm is closed while the mirror 338 is raised up and the shutter is started. After this control of the shutter in the same way as in case with priority on shutter time the mirror 333 as well as the lever 305 are returned.

Figure 5:
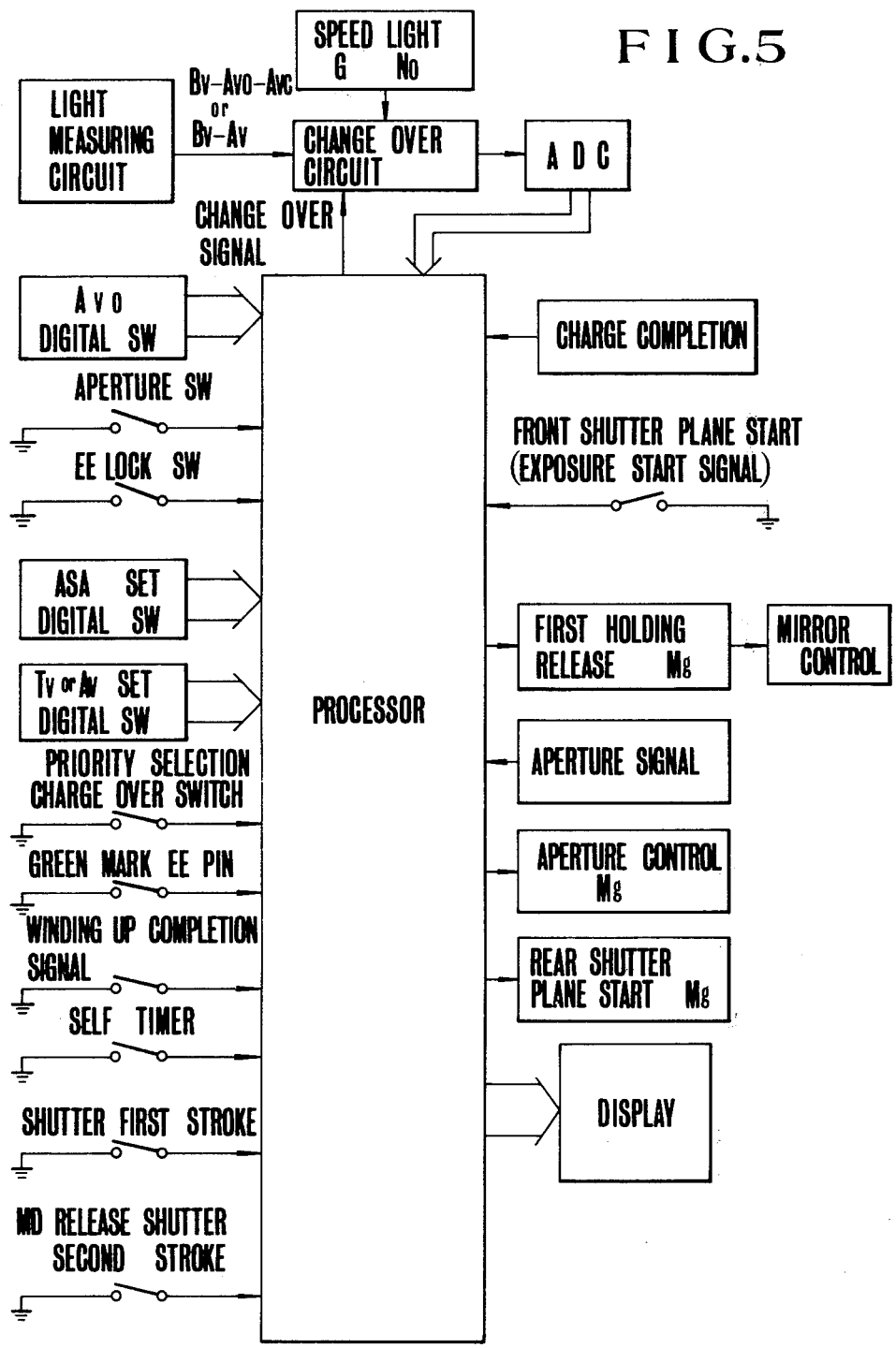
FIG. 5 shows a circuit system of another embodiment equipped with the exposure control system in accordance with the present invention.

FIG. 5 shows a circuit system of another embodiment equipped with the exposure control system in accordance with the present invention, whereby the Sv value as well as the Avo value in FIG. 3 are also put in the circuit as digital information. Further in this embodiment, the exposure control by means of the speed light or the flash bulb as well as the self-timer photography are carried out by means of the order from the processor.

Figure 6:
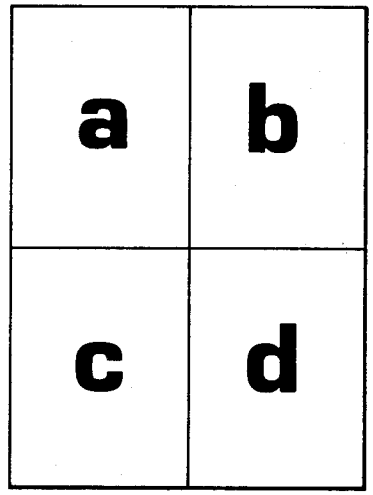
FIGS. 6a to 6d shows an example of the flow chart of the equipment shown in FIG. 5.

FIG. 6 shows an example of the flow chart of the equipment shown in FIG. 5. The operation of the device shown in FIG. 5 is explained in accordance with FIG. 6. When the shutter is pushed down to the first stroke the current is supplied to the circuit, whereby the indications are cleared. Then the flash light photography or the day light photography is determined and in case of the day light photography, the input of the charge completion signal is determined. In case there is no charge completion signal, the output of the measuring circuit is analog-digital converted in such a manner that the converted value is stored in the register. In the case of the totally opened light measurement the value (Bv−Avo−Avc) and in the case of the light measurement with actual aperture value, the value (Bv−Av) is memorized. Then from the digital switch the digital value of the vaue Sv is taken out in such a manner that the above mentioned register value is added to the value (Bv−Avo−Avc) or the value (Bv−Av) so as to be stored in the register. Then the light measurement with actual aperture value or the totally opened aperture value is determined. In the case of the light measurement with totally opened aperture, the value Avc is processed from the signal Avo and the value Avo and Avc are added to Bv−Avo−Avc+Sv so as to obtain Ev (=BV+Sv) to be stored. Then the value of the digital switch for setting Tv or Av is picked up. Then whether the state is for EE photography or not is determined. Namely; whether the lens ring is set at the green mark or not is determined. In the case of EE photography, the value of the digital switch is subtracted from the Ev value. Then whether the priority is on the shutter time or the aperture value is determined. In the case of photography with shutter time priority, the value of the digital switch is decoded and displayed as the shutter time. Further the result of the above mentioned subtraction is decoded and displayed as the value Av. Then in case the aperture value of the lens to be used is for the step number control (Av−Avo) is processed so as to obtain the number of the control steps Avs. Then the sign of the result of this subtraction is determined and in case the sign is negative, the under brightness alarm is given and the start position ( $\bigotimes$ in the drawing) is resumed. In case the sign of the result of the subtraction is positive, the Tv value of the preset value and the Avs value of the operation result are transferred to the control register.

Then whether the shutter is pushed down to the second stroke or not is determined and in case the shutter is pushed down to the second stroke the camera is ready for taking photography. In this case, whether the film is wound up or not is determined. In case the shutter is not pushed down to the second stroke whether the EE is locked or not is determined. In case the EE is not locked the flow returns to the start position, while in case the EE is locked, whether the shutter is pushed down to the second stroke or not is determined from the beginning. In case the film is not wound up, the start position is resumed while the film is wound up, whether the self-timer is selected or not is determined. In case the self-timer is selected the time of the self-timer is controlled. While in case the self-timer is not selected the time of the self-timer is not controlled.

Then the current is supplied to the magnet for releasing the first holding so as to control the aperture. Then whether the front shutter plane started or not is determined, whereby in case the front shutter plane did not start, the determination is repeated. Then whether the photography is under flash light or not is determined, whereby in case the photography is under flash light, the determination is repeated. In case the photography is under flash light the actual shutter time is prolonged and after the lapse of this prolonged time, the current supply to the magnet for holding the rear shutter plane is interrupted so as to terminate the exposure. Thus the registers are cleared and the camera assumes the initial state.

In case the photography is under the flash light at the first determination, the maximum value of the number of the control step Avs is sent to the control register. After that the same processes mentioned above are repeated. When in case of the determination of the charge completion the charge completion signal comes from the speed light, the value of the guide number voltage (corresponding to Av voltage) of the speed light is analog-digital converted so as to determine the guide number and obtain the Av value connected with auto photography. Then Avo is subtracted from Av, (Av−Avo) so as to obtain Avs, determining the sign thereof. In case the sign is negative, the under exposure alarm is given and the start is resumed. In case the sign is positive, the Tv value is made for the time of the flash light photography, say 1/80 sec., whereby Avs is transferred to the control register while the Tv value and the Av value are decoded and displayed. The flow after that is same as explained above.

FIG. 7(a) shows another concrete embodiment of the photographic information setting part for the common input of the priority information. In the drawing, 401 is the information setting dial on whose upper surface there are an indication of the shutter time value and the selecting position SOS for closing the shutter at an optional time during a long time exposure and on whose side surface there is provided an indication of the aperture value. 401a is the index for indicating the selected shutter time. 402 is the click plate presenting a contact piece 402a, whereby the pin 401b fixed on the above mentioned dial 401 engages in the engaging hole 402b in such a manner that the click plate rotates with the dial 401 as one body. 403 is the click claw pivoted on the pin 404 and energized counterclockwise by means of the spring 405 whereby the claw part 403a is in contact with the above mentioned click plate 402. 406 is a shaft those interior serves as a bearing, being fixed on the base plate 408 together with the print plate, 407 for the information input, whereby the click plate 402 and the information setting dial 401 are rotatably provided on the shaft 406 and prevented from escaping along the thrust direction by means of a nut 409. The print plate 407 for the information input composes a variable resistance, which can be used for setting either the shutter time or the aperture value and produces an electrical signal in such a manner that when during a long time exposure the information setting dial is selected at the position SOS the contact $S_{110}$ delivers the shutter closing signal. 410 is a winding up shaft whose one end 410a is connected with a mechanism for charging the shutter and the film. Further, the winding up shaft 410 is rotatably engaged with the above mentioned shaft 406 while the one end 410b is engaged with the intermediate member 411 so as to be rotated as one body. The winding up lever 412 is engaged with the pin 411b of the intermediate member 411 so as to build one body with the intermediate member 411, being kept at the end 410b of the winding up shaft 410 by means of the fixing screw. In this way the winding up lever 412 is made one body with the winding up shaft 410. 413 is the priority mode changing over member, being provided on the circumference of the above mentioned information setting dial and presenting an index 413c slidable along the inside of the cover 414 for indicating the aperture value. The cover 414 is fixed on the base plate 408, presenting a window 414a enabling the photographer to observe the aperture value indicated. The priority mode changing over member presents an operation part 413a to be operated from outside and the end part 413b. The switch $S_{400}$ is intended to transfer the change over of the priority mode to the operation part of the camera, in collaboration with the end 413b of the above mentioned priority mode change over member. The selection position SOS of the above mentioned information setting dial can be provided at a different position on the camera body as a switch SOS or can be designed so as to be remote controlled preventing the manual movement from the camera, because the switch is operated during exposure.

Figure 7B:
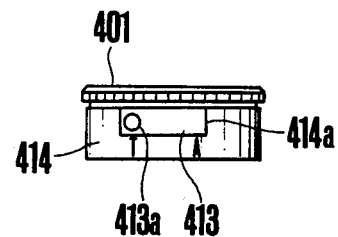
FIGS. 7(b) and (c) show side views of the information setting dial of the embodiment of FIG. 7(a), and respectively the case with priority on shutter time and with priority on aperture value.
Figure 7C:
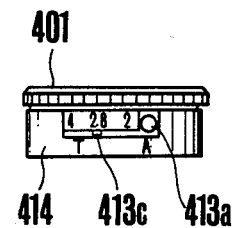
FIGS. 7(a), 8(a) and 9(a) respectively show a specific embodiment of the photographic information setting part for the information inputs common for shutter time priority and aperture value priority.
Figure 6A:
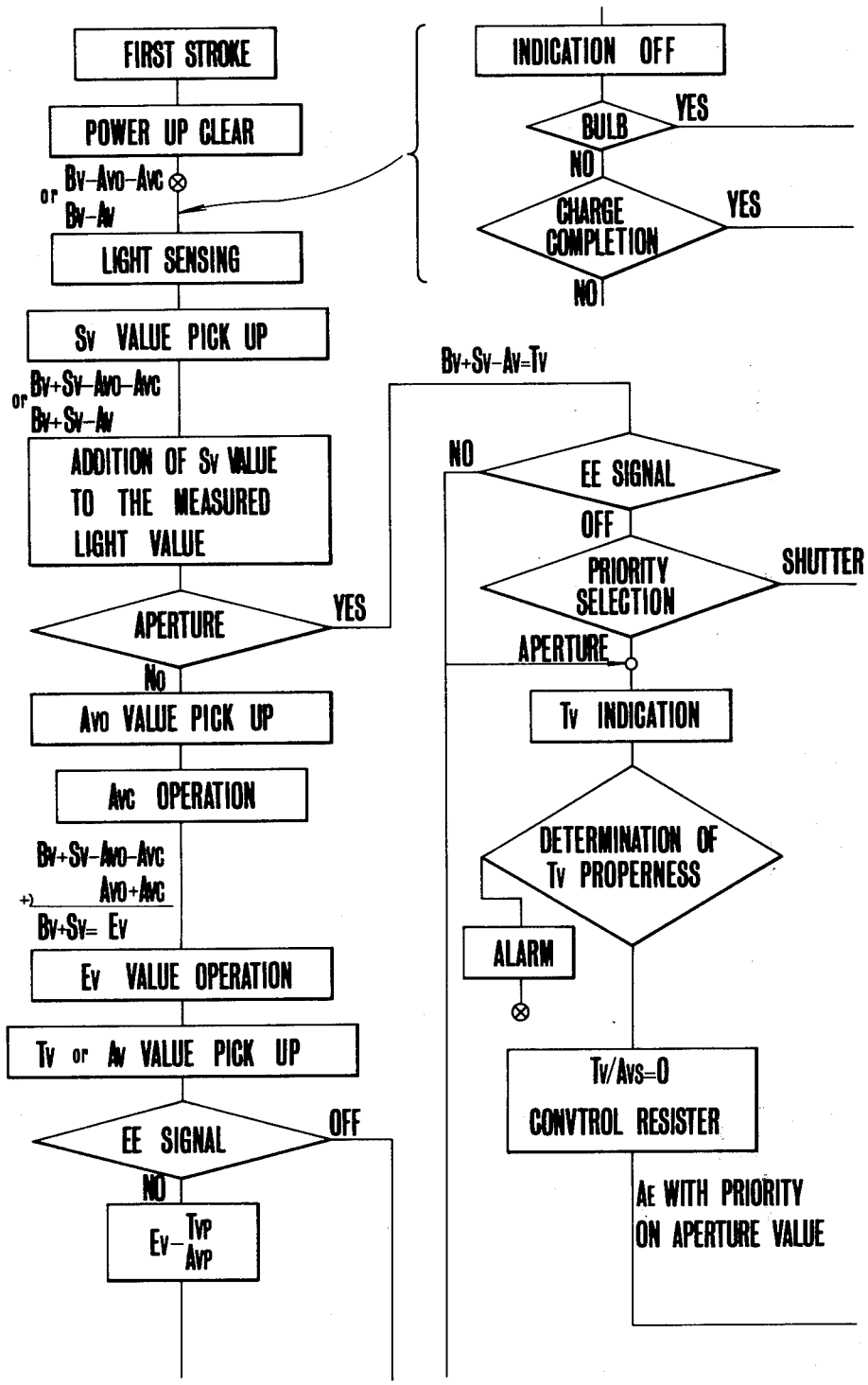
Figure 6B:
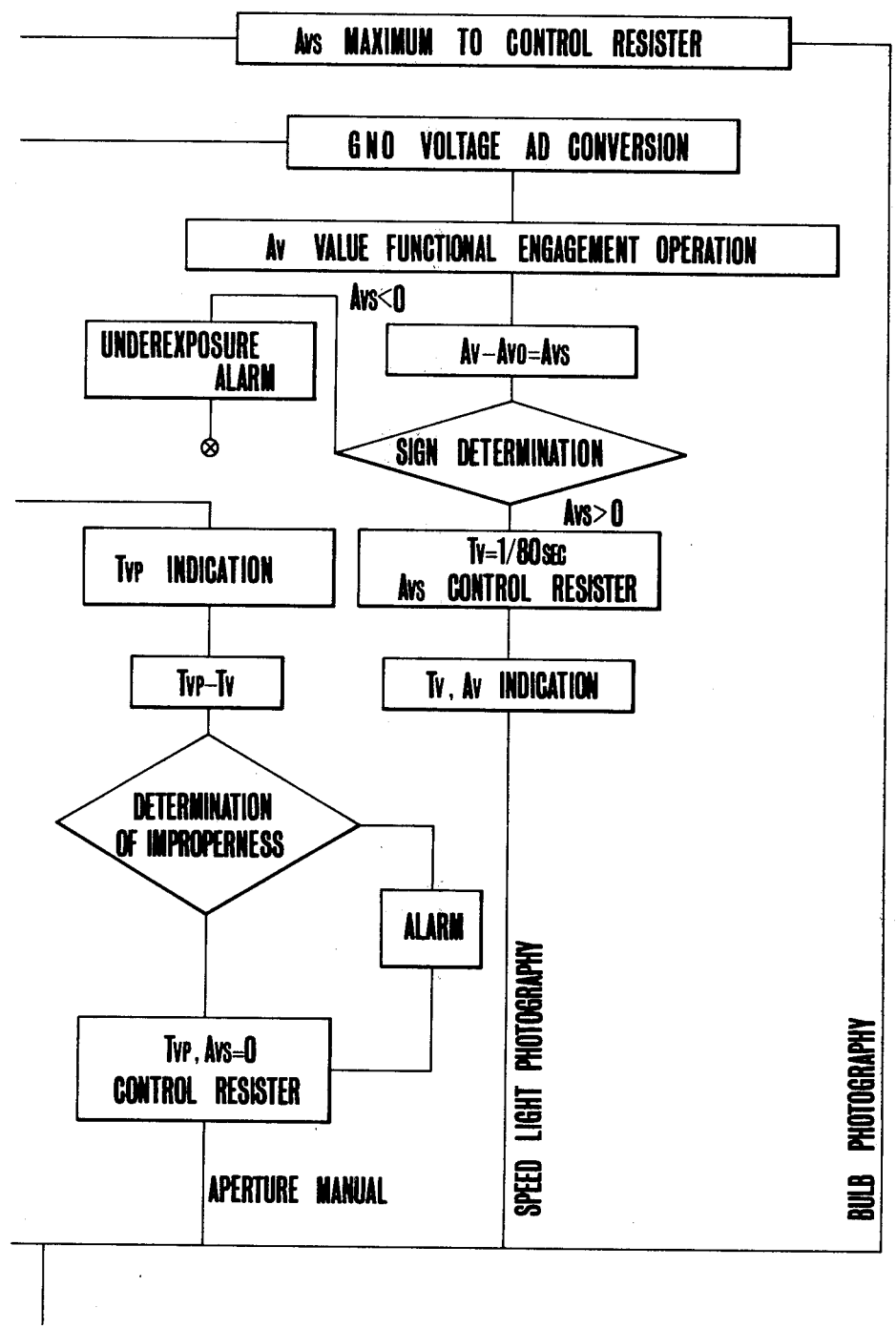
Figure 6C:
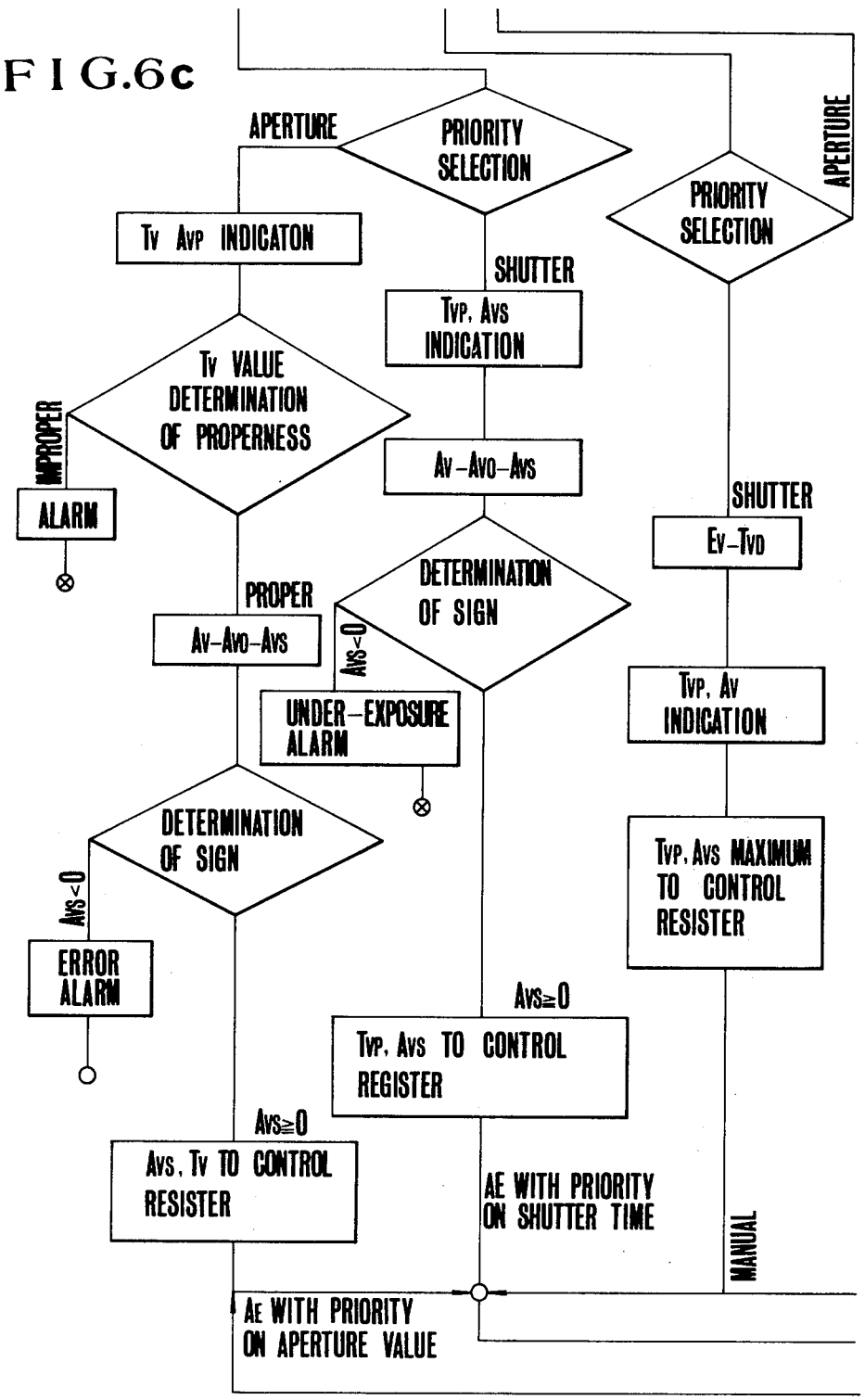
Figure 6D:
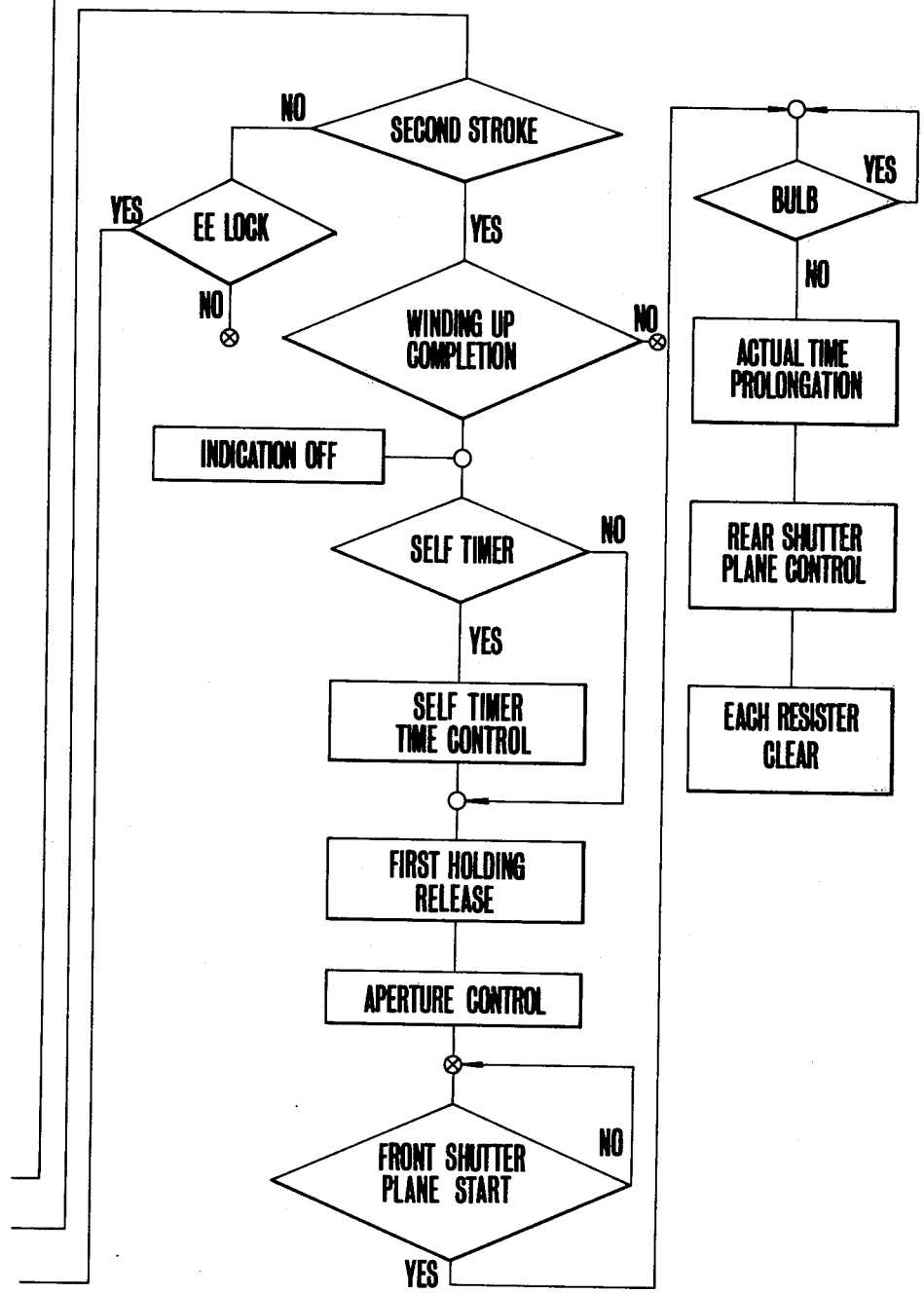
Figure 7A:
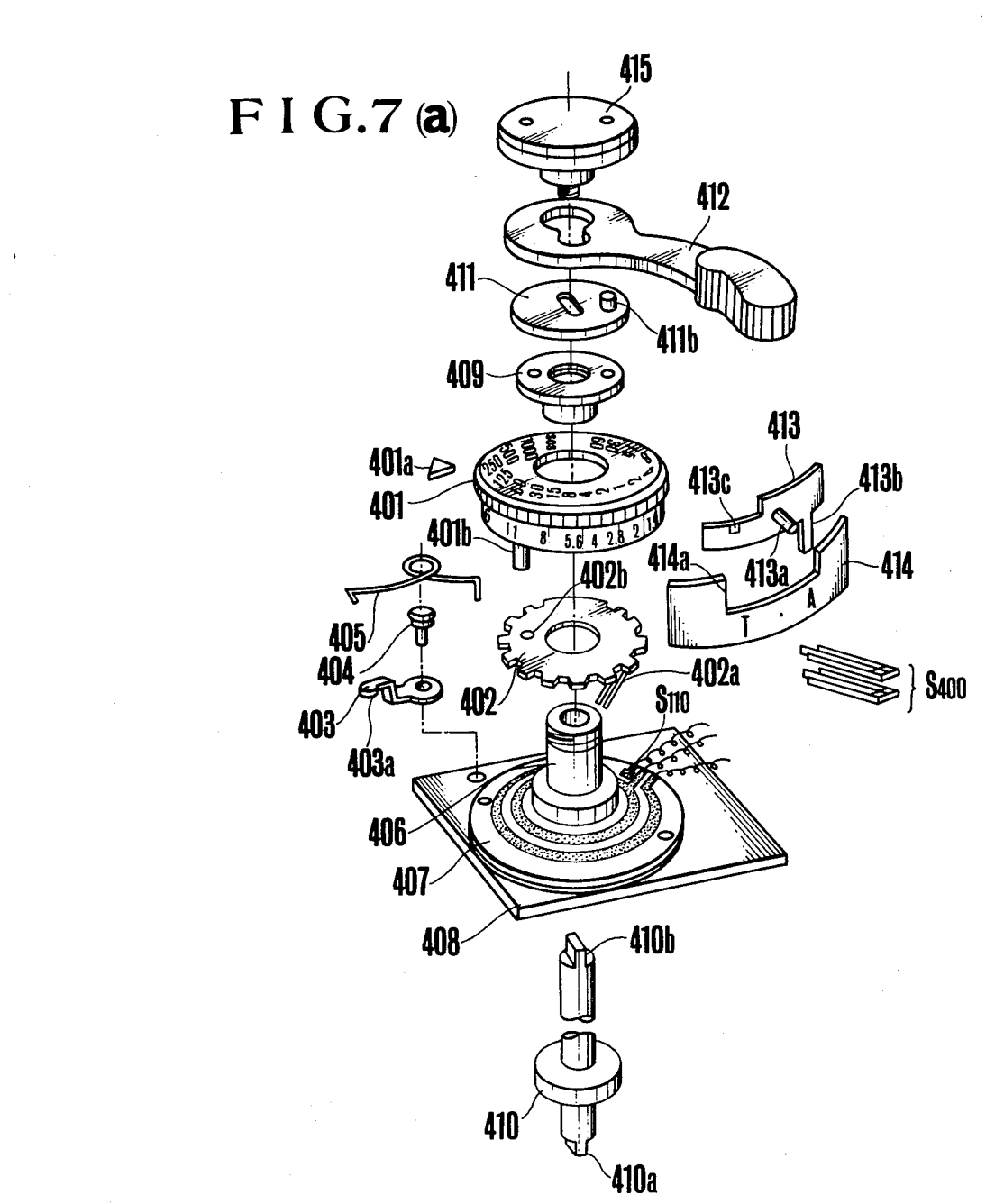

FIGS. 7(b) and (c) respectively show a side view of the information setting dial of the embodiment shown in FIG. 7(a), respectively in the priority mode of the shutter time and the aperture value. Namely in case of the shutter time priority mode the operation part 413a of the priority mode change over member 413 is operated so as to set the cover 414 at the position T, whereby the aperture indication in the window 414a is not seen any more, while in case of the aperture value priority mode the operation part 413a of the priority mode change over member 413 so as to set the cover 414 at the position A, whereby the index 413 seen in the window 414a indicates the then aperture value.

Below, the operation of the above mentioned embodiment will be explained. In case the shutter time priority mode the priority mode change over member 413 is set at the side T. At this time, the aperture value indication of the information setting dial is covered and the switch $S_{400}$ is in collaboration. By optionally turning the information setting dial 401 the shutter time value is set at the index 401a, whereby the contact piece 402a of the click plate 402 moves sliding on the print plate for the information input so as to produce the Tv value corresponding to the set shutter time. Hereby when it is desired to close the shutter to prepare for the next photographying during a long exposure time for example 30 sec., the information setting dial 401 is rotated so as to be set at SOS whereby the magnet for controlling the rear shutter plane is actuated so as to close the shutter, terminating the photography.

In the case of the aperture value priority mode, the priority mode change over member 413 is set at the side of A, whereby the aperture value appears at the window 414a and the switch $S_{400}$ is changed over. When the aperture value is set at the index 413c, the contact piece 402a of the click plate 402 moves sliding on the print plate 407 for the information input producing the Av valve corresponding to the set aperture value. When even in case of the aperture value priority mode it is desired to stop photographying on the way when the exposure time is too long, the information setting dial 401 is rotated to be set at SOS, when the rear shutter plane starts to run so as to close the exposure.

Figure 8A:
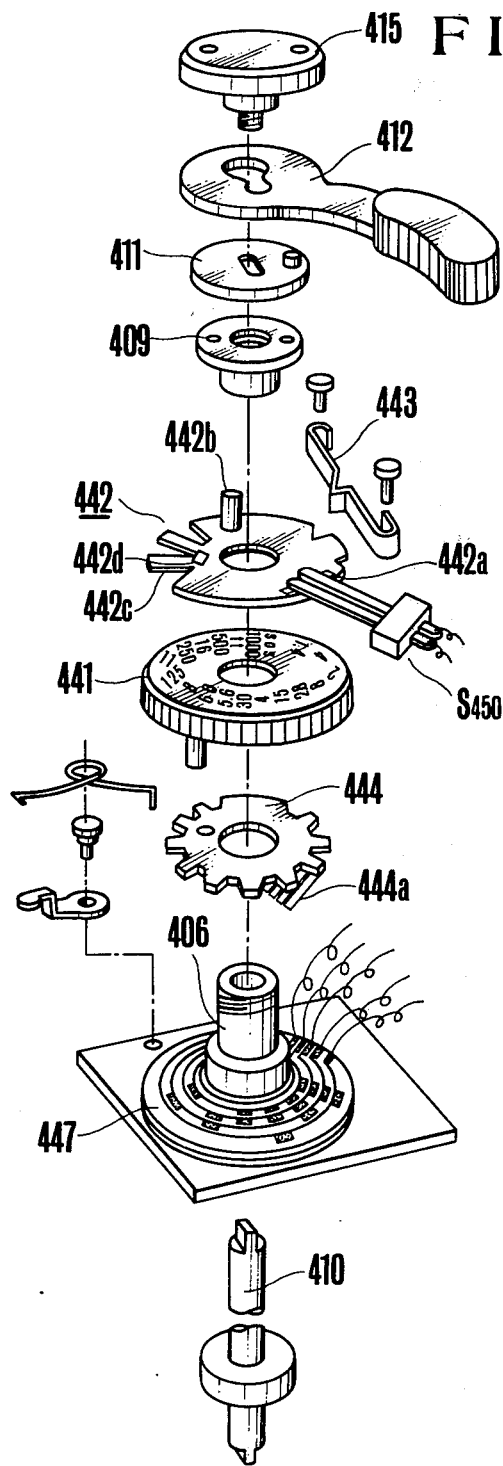

FIG. 8(a) shows another concrete embodiment of the photographic information setting part. In the drawing, the same members as those in FIG. 7(a) present the same figures. 441 is the information setting dial on whose upper surface the shutter time values and the aperture values are engaged alternatively. 442 is the priority mode change over member rotatable on the above mentioned information setting dial 441, presenting on the upper surface the conductive part 442a, the operation part 442b and the index 442d, whereby the conductive part 442a works in collaboration with the switch S$_{400}$ so as to convert the priority change over operation into an electrical signal to be transmitted to the processing part of the camera. On the circumference of the priority mode change over member 442 there is provided a notch 442c which in collaboration with the priority mode change over operation indicate either the shutter time value or the aperture value on the information setting dial is indicated. When for example the shutter time priority mode is set, the priority mode change over member 442 fixed at a position at which the shutter time is indicated, whereby when in this state the information setting dial 441 is rotated, the shutter time value is always indicated in the notch 442c by means of the click effect. 443 is the click spring for molding the priority mode change over member 442 at the changed over position. 444 is the click plate rotatable as one body with the information setting dial 441, presenting a contact piece 444a for producing an electrical signal. 447 is the print plate for the information input so designed that the print plate 447 in collaboration with the contact piece 444a produces a digital signed not only for the shutter time but also for the aperture value.

Figure 8B:
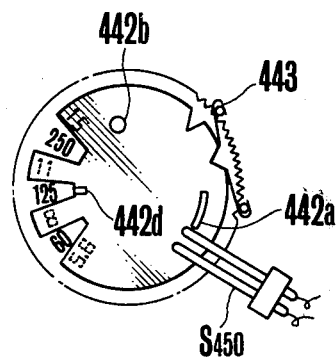
FIGS. 8(b), (c) and FIGS. 9(b) and (c) show plan views of the information setting dial parts of the embodiments shown in FIG. 8(a) and FIG. 9(a), and respectively the case with priority on shutter time and on aperture value.
Figure 8C:
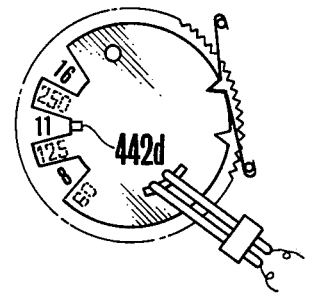

FIGS. 8(b) and (c) respectively are a plane view of the information setting dial of the embodiment shown in FIG. 8(a) respectively in the case of the shutter time priority mode (1/25 sec.) and in the case of the aperture value priority mode (11).

The operation of the photographic information setting device shown in FIGS. 8(a), (b) and (c) is as follows. In the case of the shutter time priority mode, the priority mode change over means 442 is operated in such a manner that only the shutter time value is indicated through the notch 442c. When in this state the information setting dial is rotated in such a manner that an optional shutter time value is set at the index 442d, the print plate 447 for the information input delivers a digital signal to the processing part of the camera. When in the case of the aperture value priority mode the priority rode change over member is operated, the switch S$_{450}$ delivers the aperture value priority mode signal to the processing part of the camera, whereby when an optional aperture value is set at the index 442d, the print plate for the information input delivers to the processing part of the camera. Hereby the method of arrangement of the aperture value and the shutter time on the information setting dial 441 is not necessarily an alternative one, and they can be arranged on the two coaxial circles, or on the two semi-circles. After all it is sufficient that by means of the priority mode change over means either the aperture value or the shutter time value can be indicated.

Figure 9A:
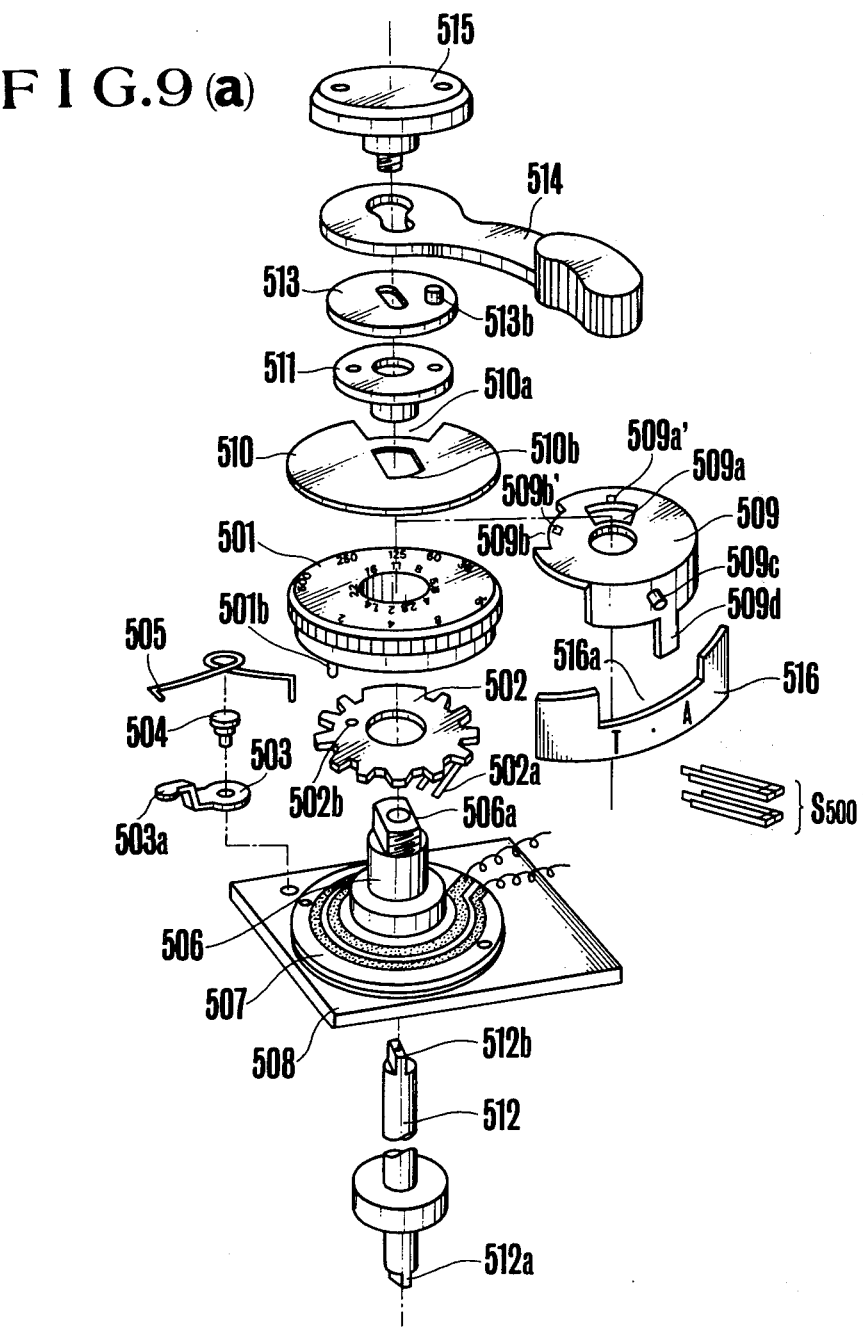

FIG. 9(a) shows another concrete embodiment of the photographic information setting part. In the drawing, 501 is the information setting dial whose upper part serves as the set information display member, whereby the figures for the aperture value are arranged on the internal circle while the figures for the shutter time are arranged on the xexternal circle arranged coaxially with the internal circle. 502 is a click plate presenting a contact piece 502a, whereby the pin 501b fixed on the dial 501 engages in the hole 502b in such a manner that the click plate rotates as one body with the contact piece 502a. 503 is the click claw borne on the pin 504 and energized counterclockwise by means of the spring 505 in such a manner that the claw part 503a is in contact with the click plate 502. 506 is the shaft bearing the above mentioned dial 501, being fixed on the base plate 508 together with the print plate 507 for the information input, whereby the print plate 507 forms a variable resistance, being in contact with the contact piece 502a of the click plate and producing an analog signal corresponding to the photographic information set on the information setting dial 501. The information setting dial 501, the contact piece 502a and the print plate 507 form the photographic information setting part. 510 is the fixed plate presenting a window 510a, being engaged with the part 506a of the shaft 506 so as to be secured. 509 is the priority mode change over member, serving as the indication change over means and engaged with the shaft so as to be rotatable on the dial 501. The priority mode change over member 509 presents a window 509b for displaying the shutter time, the index 509b' for indicating the selected shutter time, a window 509a for displaying the aperture value, the index 509a' for indicating the selected aperture value, the operation part 509c and the end part 509d. 516 is the change over display plate, being fixed on the camera body so as to be arranged at the side of the priority mode change over member 509. By means of the window 516a of the change over display plate 516 the movement of the operation part 509c of the priority mode change over means is limited, while when the change over means is set at the side of A by means of a click (not shown in the drawing) it is aperture value priority mode and when the change over means is set at the side of T it is shutter time priority mode. S$_{500}$ is the priority mode change over switch, being changed over in functional engagement with the end 509d of the priority mode change over member. The click plate 502, the dial 501, the priority mode change over member 509 and the fixed plate 510 are engaged with the shaft 506, and prevented from escaping from the shaft in thrust direction by means of the nut 511. The above mentioned priority mode change over member 509 and the change over switch S$_{500}$ form the priority mode change over means. Further, the priority mode change over member 509 and the fixed plate 510 form the display change over means for selectively displaying either the shutter time or the aperture value out of the photographic information on the dial 501. 512 is the winding up shaft whose one end is connected with a mechanism for charging the shutter, the film and so on. Further the winding up shaft 512 is engaged with the shaft rotatably, whereby the end part 512b is engaged with the intermediate member 513 so as to be rotatable as one body. The winding up lever 514 engages with the pin 513b of the intermediate member 513 to be as one body, being kept at the end 512b of the winding up shaft by means of the screw 515. Thus the winding up lever 514 is made one body with the winding up shaft 512.

Figure 9B:
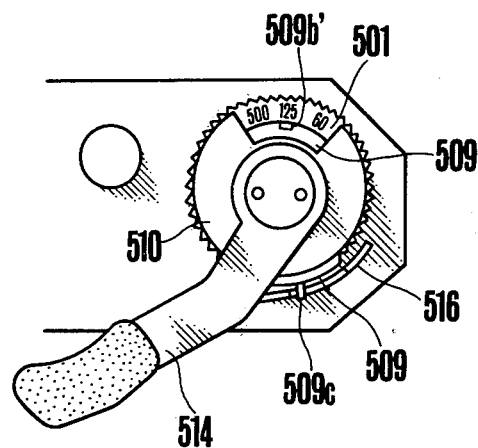

FIGS. 9(b) and (c) respectively are plan views of the embodiment shown in FIG. 9(a), respectively in the case of the shutter time priority mode and the aperture value priority mode.

Figure 9C:
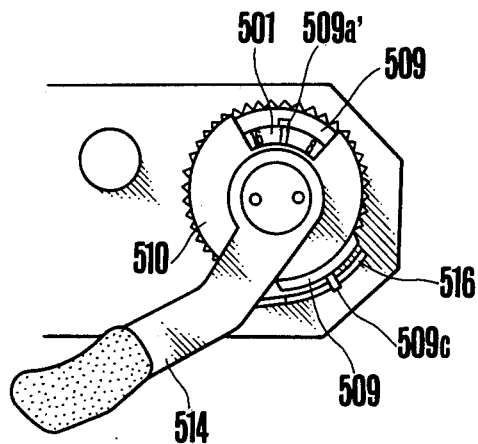

Below the operation of the embodiment shown in FIGS. 9 (a), (b) and (c) will be explained. In the case of the shutter time priority mode the priority mode change over means 509 is set at the side of T. At this time, as is shown in FIG. 9 (b), the shutter time on the dial 501 is displayed through the window of the fixed plate 510 and the window 509b of the priority mode change over means 509. At this time, the change over switch S$_{500}$ is set at the first change over position. When then the dial 501 is turned so as to set the shutter time at the index 509*b'*, the contact piece 502*a* of the click plate 502 moves sliding on the print plate 507 for the information input so as to produce the Tv value corresponding to the set shutter time. In the case of the aperture value priority mode, the priority mode change over member 509 is set at the side of A. At this time, as is shown in FIG. 9(*c*) the aperture value on the dial 501 is displayed through the window of the fixed plate 510 and the window 509*a* of the priority mode change over member 509. At this time, the change over switch $S_{500}$ is set at the second change over position. When then the dial 501 is turned so as to set the aperture value at the index 509*a'*, the Av value is produced.

Although the above mentioned photographic information setting means produces an analog signal, it is possible to produce a digital signal by combining the print plate 507 and the contact piece 502*a* or to produce a mechanical signal instead of an electrical signal, by moving the wire mechanically connected.

As explained above, by means of the photographic information setting device in accordance with the present invention, it is possible to set both Tv value and Av value by means of a single input means so that the number of the parts as well as the manufacturing cost can be reduced, and further, as it is designed as that only the photographic information values for the corresponding priority mode are displayed, it is possible to eliminate the misoperation.

As explained so far in accordance with various embodiments, in case of the exposure control system in accordance with the present invention the information setting means as well as the processing means can be used in common for the shutter time and the aperture value so that a camera with both priority modes can be realized and the circuit as well as the mechanism can be simply made. Thus the profit of the present invention is such that in accordance with the present invention various kinds of cameras with both priority modes can be composed.

What is claimed is:

1. An exposure control circuit for a camera, comprising:
   (a) a shutter time control circuit to control a shutter time based on an input signal;
   (b) a diaphragm aperture control circuit to control a diaphragm based on an input signal;
   (c) a single information setting means for selectively setting a shutter time value information or a diaphragm aperture value information;
   (d) a single signal forming means for forming an electrical signal at a common output terminal corresponding to the set information in association with said information setting means;
   (e) a mode selecting operation means for selecting a diaphragm aperture value presetting mode and a shutter time presetting mode; and
   (f) a connecting means for connecting said signal forming means selectively with said shutter time control circuit or a diaphragm control circuit, wherein said connecting means is functionally connected to said mode selecting operation means, and connects said signal forming means with the diaphragm control circuit when the diaphragm aperture value presetting mode is selected while connecting the signal forming means with the shutter time control circuit when the shutter time presetting mode is selected.

2. A circuit according to claim 1, in which said information setting means has a diaphragm aperture value symbol to indicate a diaphragm aperture value and a shutter time value symbol to indicate a shutter time value, marked on the surface thereof, and at the same time is so made that said symbols can be visually recognized based on the mode selected by the mode selection action of said mode selecting operation means.

3. An exposure control circuit for a camera, comprising:
   (a) a single photographic information setting means for mechanically and selectively setting a shutter speed value or aperture value;
   (b) single electrical signal forming means coupled to said photographic information setting means for producing an electrical signal at a common output terminal corresponding to the shutter speed or aperture value set by said photographic information setting means;
   (c) a light measuring circuit for producing an electrical signal corresponding to the intensity of light;
   (d) a mode selection means for selecting a shutter speed value preset mode or an aperture value preset mode;
   (e) an operation circuit which is connected to said light measuring circuit and electrical signal forming means for producing an electrical signal corresponding to the shutter speed value based on a preset aperture value and intensity of light when said aperture value preset mode is selected, and producing an electrical signal corresponding to the aperture value based on a preset shutter speed value and intensity of light when said shutter speed value preset mode is selected;
   (f) a shutter time control circuit for controlling a shutter time based on a supplied electrical signal;
   (g) an aperture control means for controlling the aperture value based on a supplied electrical signal; and
   (h) a change over means coupled to said mode selection means for connecting said output of operation circuit to said shutter control circuit and connecting electrical signal forming means to said aperture control means when said aperture value preset mode is selected, and for connecting said output of operation circuit to said aperture control means and connecting said electrical signal forming means to said shutter control circuit when said shutter speed value preset mode is selected.

4. An exposure control circuit for a camera, comprising:
   (a) a single electrical signal forming means for forming an electrical signal at a common output terminal corresponding to a preset shutter time information when the shutter time is preset and forming an electrical signal corresponding to a preset aperture value information when the aperture value is preset;
   (b) a light measuring circuit for producing an electrical signal corresponding to the intensity of light;
   (c) a mode selection means for selecting a shutter speed value preset mode or an aperture value preset mode;
   (d) an operation circuit which is connected to said light measuring circuit and electrical signal forming means for producing an electrical signal corresponding to the shutter speed value based on a preset aperture value and intensity of light when said aperture value preset mode is selected, and producing an electrical signal corresponding to the aperture value based on a preset shutter speed value and intensity of light when said shutter speed value preset mode is selected;

(e) a shutter time control circuit for controlling a shutter time based on a supplied electrical signal;

p1 (f) an aperture control means for controlling the aperture value based on a supplied electrical signal;

(g) a change over means coupled to said mode selection means for connecting said output of said operation circuit to said shutter control circuit and connecting single electrical signal forming means to said aperture control means when said aperture value preset mode is selected, and connecting said output of operation circuit to said aperture control means and connecting said single electrical signal forming means to said shutter control circuit when said shutter speed value preset mode is selected.

5. An exposure control circuit for a camera in accordance with claim 3, wherein the single photographic information setting means has a symbol to indicate shutter time value and a symbol to indicate diaphragm aperture value, for the purpose of setting a desired shutter time value or diaphragm aperture value, and the mode selection means provides a condition such that a symbol indicating shutter time or a symbol indicating a diaphragm aperture value of said single photographic information setting means according to the selected mode can be visually recognized.

6. An exposure control circuit for a camera in accordance with claim 3, wherein said single information setting means has a shutter time symbol to indicate shutter time value and a diaphragm aperture value symbol to indicate diaphragm aperture value placed on the surface thereof; and said mode selection means includes a part to cover the surface of said single information setting means having said symbols marked thereon, so that the diaphragm aperture symbol or the shutter time value symbol can be selectively covered by the mode selection action and the symbol corresponding to the selected mode can be visually recognized.

7. An exposure control circuit for a camera in accordance with claim 3, wherein the single photographic information setting means consists of an operation dial, a concentric circle on which dial bearing a shutter time value indication part having a series of symbols representing shutter time values and an aperture value indication part having a series of symbols representing aperture values, and the single electrical signal forming means being a variable resistance, whose resistance value is determined by the rotation angle of the operation dial whereby an electrical signal corresponding to the shutter time value or the aperture value is delivered from a common output terminal of the variable resistance.

8. An exposure control circuit for a camera in accordance with claim 7, wherein the value of the variable resistance changes according to the APEX value of the set shutter time value or the set aperture value.

9. An exposure control circuit for a camera in accordance with claim 3, wherein the single photographic information setting means consists of an operation dial, a concentric circle on which dial bearing a shutter time value indication part having a series of symbols representing shutter time values and an aperture value indication part having a series of symbols representing aperture values, and the single electrical signal forming means being a digital signal forming means which delivers the digital signal determined by the rotation angle of the operation dial from the output terminal, whereby the signal forming means delivers the digital signal corresponding to the shutter time value or the aperture value from the output terminal.

10. An exposure control circuit for a camera in accordance with claim 7, wherein the shutter time value indication part and the aperture value indication part on the dial are provided with a common operation range on the dial.

11. An exposure control circuit for a camera in accordance with claim 9, wherein the shutter time value indication part and the aperture value indication part on the dial are provided with a common operation range on the dial.

12. An exposure control circuit for a camera, comprising:

(a) an information setting operation dial, which is provided rotatably against a camera main body, and has a shutter time symbol and a diaphragm aperture value symbol marked on a concentric circle of its surface;

(b) a resistance means provided co-axially with said dial;

(c) a rotation member rotating in association with said dial;

(d) a slide contacting piece fixedly provided on said rotation member, wherein said contacting piece is made to slide on said resistance, said resistance means producing an electrical signal corresponding to the shutter time or aperture value preset by said dial selectively at a common output terminal;

(e) a shielding member provided on a front plane of the surface of said dial, wherein said member is made to shield either one of said shutter time symbol or diaphragm aperture value symbol;

(f) a selecting means for selecting a shutter presetting mode or a diaphragm aperture presetting mode, wherein said selecting means is made to be associated with said shielding member so that, when a shutter presetting mode is selected by the sliding means, said shielding member shields the diaphragm aperture value symbol, and when the diaphragm aperture presetting mode is selected, said shutter symbol is shielded;

(g) a light measuring circuit for producing an electrical signal corresponding to the intensity of light;

(h) an operation circuit connected to said light measuring circuit and said output terminal of said resistance means for producing an electrical signal corresponding to a shutter time value for proper exposure when the aperture value is preset by said dial and for producing an electrical signal corresponding to an aperture value for proper exposure when the shutter time value is preset by said dial;

(i) shutter time control circuit for controlling a shutter time based on an input signal;

(j) diaphragm aperture control means for controlling a diaphragm aperture based on an input signal;

(k) a change over means coupled to said selecting means for connecting said output of operation circuit to said shutter time control circuit and connecting the output terminal of said resistance means to said aperture control means when said aperture presetting mode is selected, and for connecting said output of operation circuit to said aperture control means and connecting said output terminal of said resistance means to said shutter time control circuit when said shutter presetting mode is selected.

13. An exposure control circuit for a camera, comprising:
   (a) an information setting operation dial, which is positioned rotatably against a camera main body and has a shutter time symbol and a diaphragm aperture value symbol, marked on the surface thereof;
   (b) a disc type code plate provided co-axially with said dial;
   (c) a rotation member rotating in association with said dial;
   (d) a plurality of slide contacting pieces fixedly provided on said rotation member, wherein said contacting pieces are made to slide on said code plates, said disc type code plate producing digital signals corresponding to the shutter time or aperture value preset by said dial selectively at common output terminals of said disc type code plate;
   (e) a shielding member provided at a front plane of the surface of said dial, wherein said member is made so as shielding either one of said shutter time symbol or diaphragm aperture value symbols;
   (f) a selecting means to select a shutter presetting mode or a diaphragm aperture presetting mode, wherein said selecting means associated with said shielding member shields the diaphragm aperture value symbol when the shutter presetting mode is selected by the selecting means, and wherein said shutter symbol is shielded when the diaphragm aperture presetting mode is selected;
   (g) a light measuring circuit for producing an electrical signal corresponding to the intensity of light;
   (h) an operation circuit connected to said light measuring circuit for producing an electrical signal at an output thereof corresponding to a shutter time value for proper exposure when the aperture value is preset by said dial and producing an electrical signal at said output corresponding to an aperture value for proper exposure when the shutter time is preset by said dial;
   (i) a shutter time control circuit for controlling a shutter time based on an input signal;
   (j) a diaphragm aperture control means for controlling a diaphragm aperture based on an input signal; and
   (k) a change over means coupled to said selecting means for connecting said output of operation circuit to said shutter time control circuit and connecting output terminals of said disc type code plate to said aperture control means when said aperture presetting mode is selected, and also connecting said output of operation circuit to said aperture control means and connecting said output terminals of disc type code plate to said shutter time control circuit when said shutter presetting mode is selected.

14. An exposure control circuit for a camera, comprising a single information setting means consisting of an operation dial, a concentric circle on which dial bearing a shutter time value indication part having a series of symbols representing shutter time values and an aperture value indication part having a series of symbols representing aperture values, and a single signal forming means being in the form of a variable resistance, whose resistance value is determined by the rotation angle of the operation dial whereby an electrical signal corresponding to the shutter time value or the aperture value is delivered from a common output terminal of the variable resistance.

15. An exposure control circuit for a camera in accordance with claim 14, wherein the value of the variable resistance changes according to the APEX value of the set shutter time value or the set aperture value.

16. An exposure control circuit for a camera in accordance with claim 1, wherein the signal information setting means consists of an operation dial, a concentric circle on which dial includes a shutter time value indication part having a series of symbols representing shutter time values and an aperture value indication part having a series of symbols representing aperture values, and the single signal forming means being a digital signal forming means which delivers the digital signal determined by the rotation angle of the operation dial from the output terminal group, whereby the signal forming means supplies the digital signal corresponding to the shutter time value or the aperture value from a common output terminal group.

17. An exposure control circuit for a camera in accordance with claim 4, wherein the single electrical signal forming means is a variable resistance, having a common output terminal for supplying an electrical signal corresponding to the shutter time when the shutter time is preset and an electrical signal corresponding to the aperture value when the aperture value is preset.

18. An exposure control circuit for a camera in accordance with claim 17, wherein the value of the variable resistance changes according to the APEX value of the set shutter time value or the aperture value.

19. An exposure control circuit for a camera in accordance with claim 4, wherein the single electrical signal forming means is a code plate, having a common output terminal for supplying a digital value corresponding to the shutter time when the shutter time is preset and a digital value corresponding to the aperture value when the aperture value is preset.

20. An exposure control circuit for a camera in accordance with claim 3, wherein the single photographic information setting means consists of a dial, having an upper plane provided with a series of symbols representing shutter times and having a side plane provided with a series of symbols representing aperture values, and a shade member for covering the side plane of the dial being provided so that the aperture value symbols are covered in the shutter time preset mode while only the shutter time symbols are visually recognized.

21. An exposure control circuit for a camera in accordance with claim 20, wherein, around the circumference of the dial, a member for covering the side plane of the dial is provided whereby a display window for displaying the aperture value symbols is provided on a part of the member, and the shade member operatively engaged with the mode selection means operates to shade the display window in the shutter time preset mode.

22. An exposure control circuit for a camera in accordance with claim 3, wherein the single photographic information setting means consists of a dial, having an upper plane including shutter time value symbols and aperture value symbols alternatively, a shade member having cover portions at certain determined intervals being provided over the upper plane of the dial, whereby the shade member is rotatable over the dial surface in operative engagement with the mode selection means so as to cover the aperture value symbols in the shutter time preset mode and the shutter time symbols in the aperture value preset mode.

23. An exposure control circuit for a camera in accordance with claim 6, wherein the single information setting means is a dial, a concentric circle on which dial being provided with the shutter time symbols and the aperture value symbols, a cover member for covering the surface of the dial is provided over the dial in such a manner that a display notch for displaying the shutter time symbols and the aperture value symbols is provided on a part of the cover member, the part to cover the surface of the single information setting means being provided between the cover member and the dial and presenting a first display window part for displaying the shutter time symbols and a second display window part for displaying the aperture value symbols.

24. An exposure control circuit for a camera in accordance with claim 3, wherein the single electrical signal forming means is a digital signal forming means operatively engaged with the photographic information setting means so as to form a digital signal based upon the preset shutter time value or the preset aperture value.

25. An exposure information setting device for a camera having a shutter speed priority automatic exposure mode and an aperture value priority automatic exposure mode comprising:
(a) single, manually-operated information setting means for selectively setting a shutter time value information or diaphragm aperture value information;
(b) single signal forming means for producing an electrical signal corresponding to a shutter time value when a shutter time value is preset by said information setting means, and for producing an electrical signal corresponding to a diaphragm aperture value when a diaphragm aperture value is preset by said information setting means; and
(c) mode selecting operation means for selecting said shutter speed priority automatic exposure mode and said aperture value priority automatic exposure mode, so that when the shutter speed priority automatic exposure mode is selected by said mode selecting operation means and the shutter time value is set by said setting means, the shutter time is controlled on the basis of the electrical signal from said forming means, and when the aperture value priority automatic exposure mode is selected by said mode selecting operation means and the aperture value is set by said setting means, the aperture value is controlled on the basis of the electrical signal from said forming means.

26. An exposure information setting device for a camera having a shutter speed priority automatic exposure mode and an aperture value priority automatic exposure mode comprising:
(a) single, manually-operated information setting means for selectively setting a shutter time value information or diaphragm aperture value information;
(b) single digital signal forming means for producing a digital signal at the output terminals corresponding to a shutter time value when a shutter time value is preset, and for producing a digital signal at the same output terminal corresponding to a diaphragm aperture value when a diaphragm aperture value is preset; and
(c) mode selecting operation means for selecting an aperture value priority automatic exposure mode and a shutter speed priority automatic exposure mode so that when the shutter speed priority automatic exposure mode is selected by said mode selecting operation means and the shutter time value is set by said setting means, the shutter time is controlled on the basis of a digital signal from said forming means, and when the aperture value priority automatic exposure mode is selected by said mode selecting operation means and the aperture value is set by said setting means, the aperture value is controlled on the basis of a digital signal from said forming means.

* * * * *